July 14, 1931.  E. D. MARTINET  1,814,172
BRICK MAKING MACHINE
Filed March 14, 1927   15 Sheets-Sheet 5
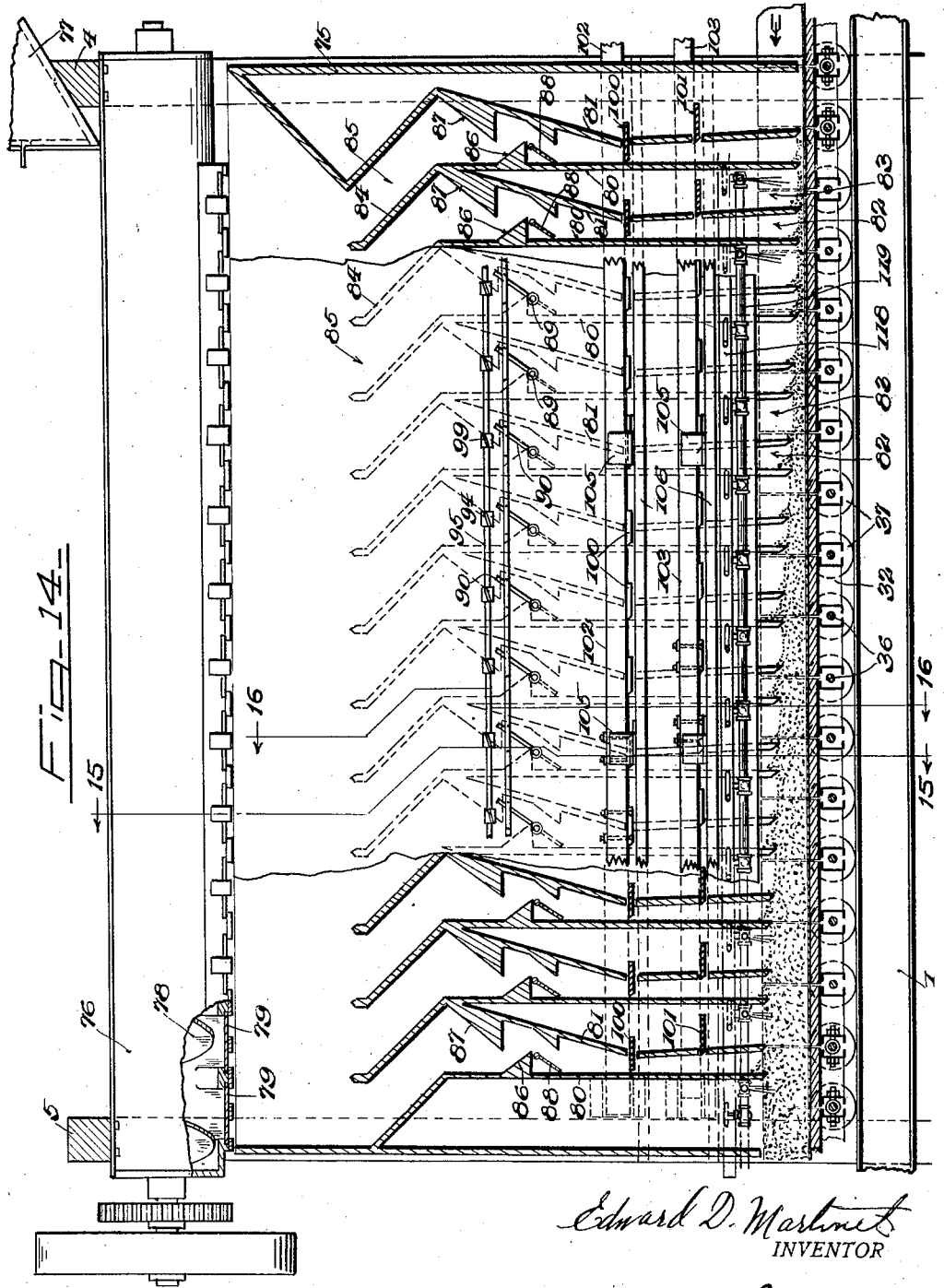
Edward D. Martinet
INVENTOR
BY
Munn & Co.
ATTORNEYS

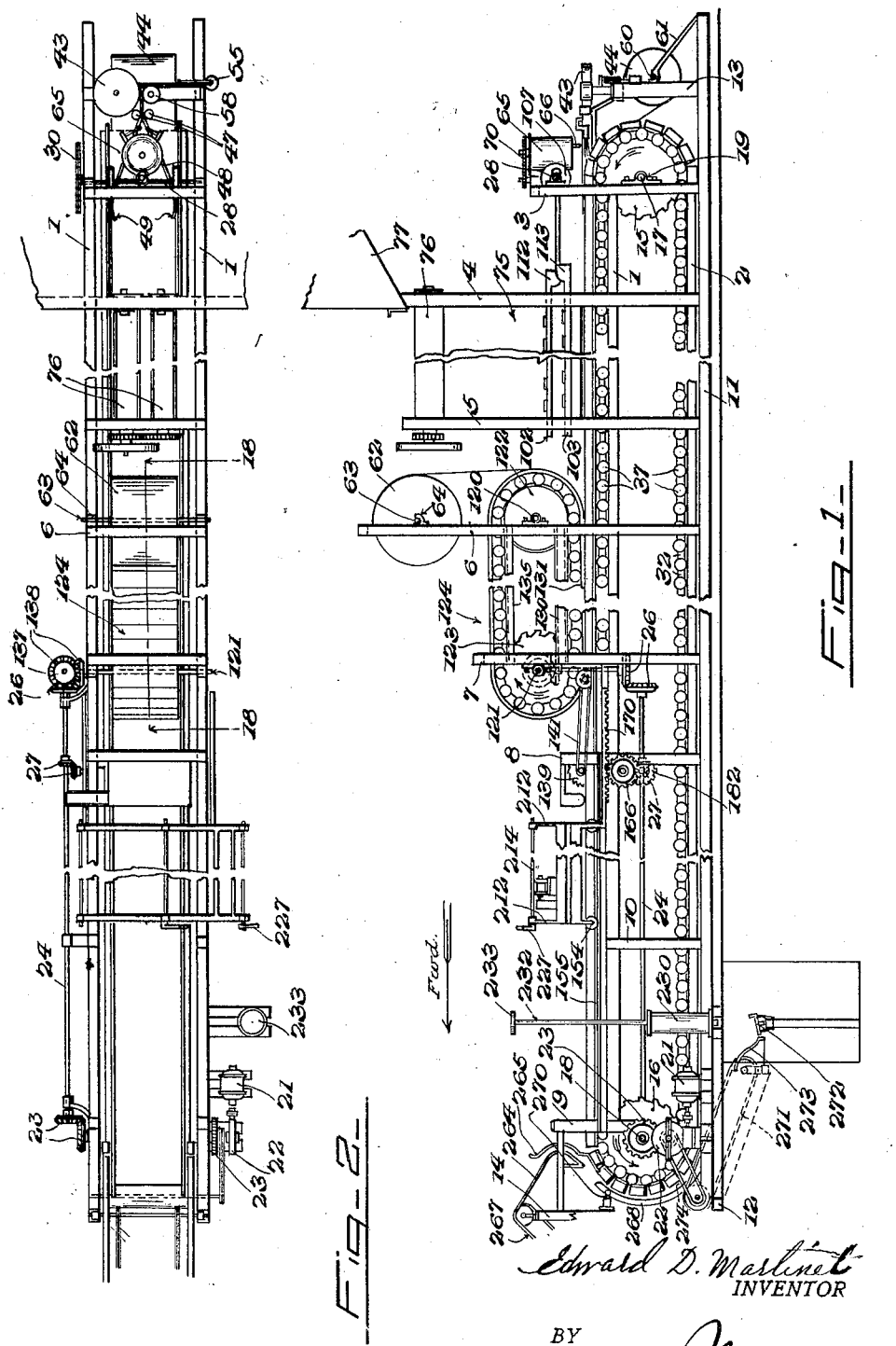

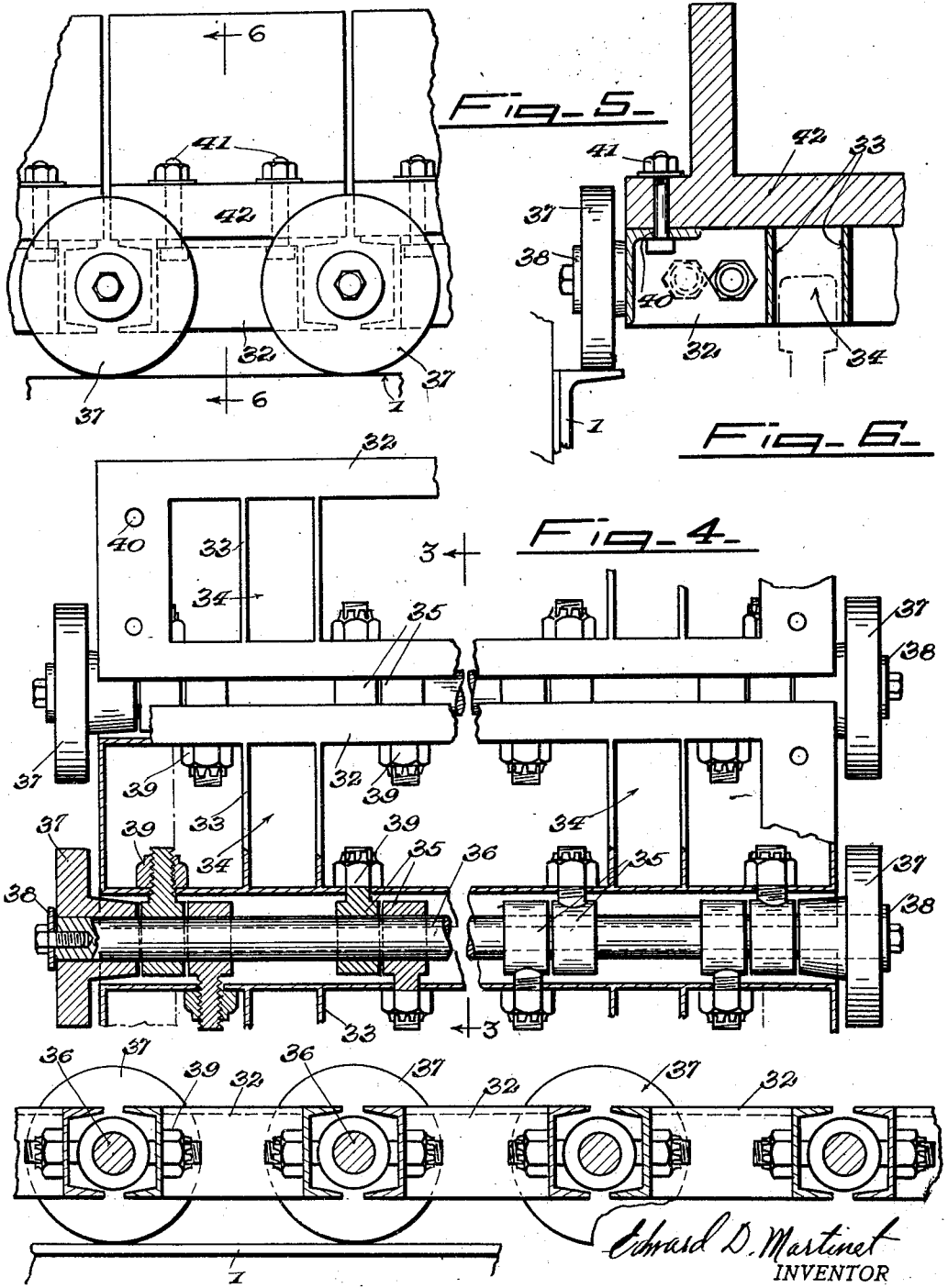

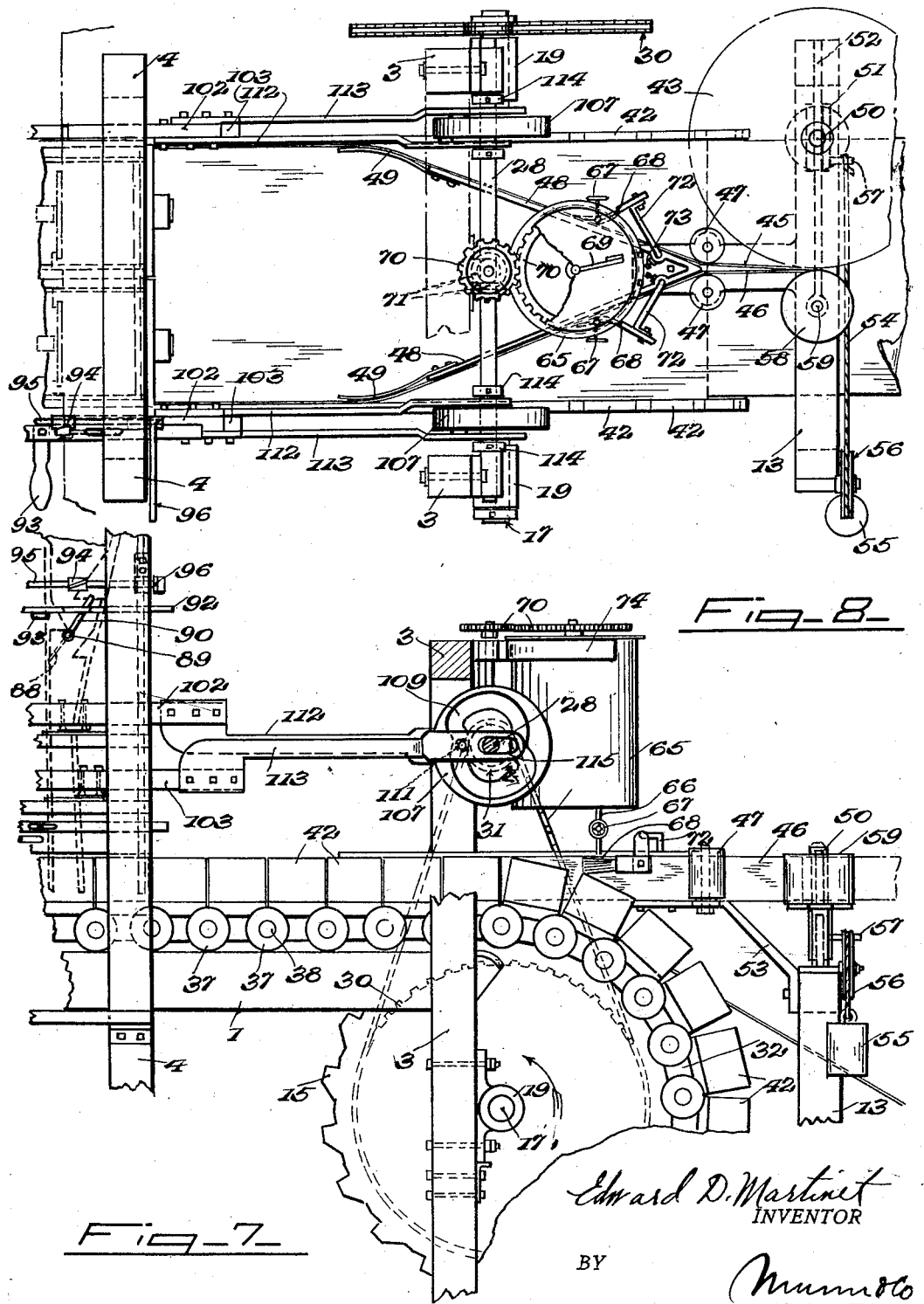

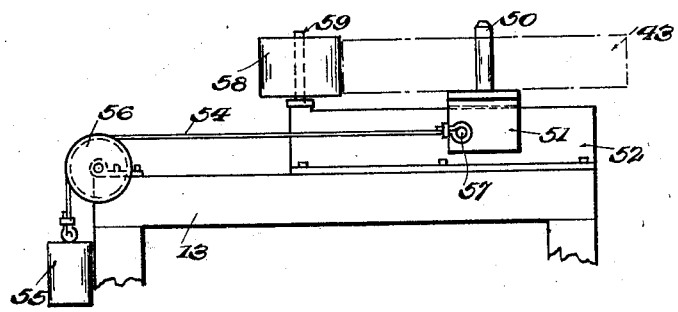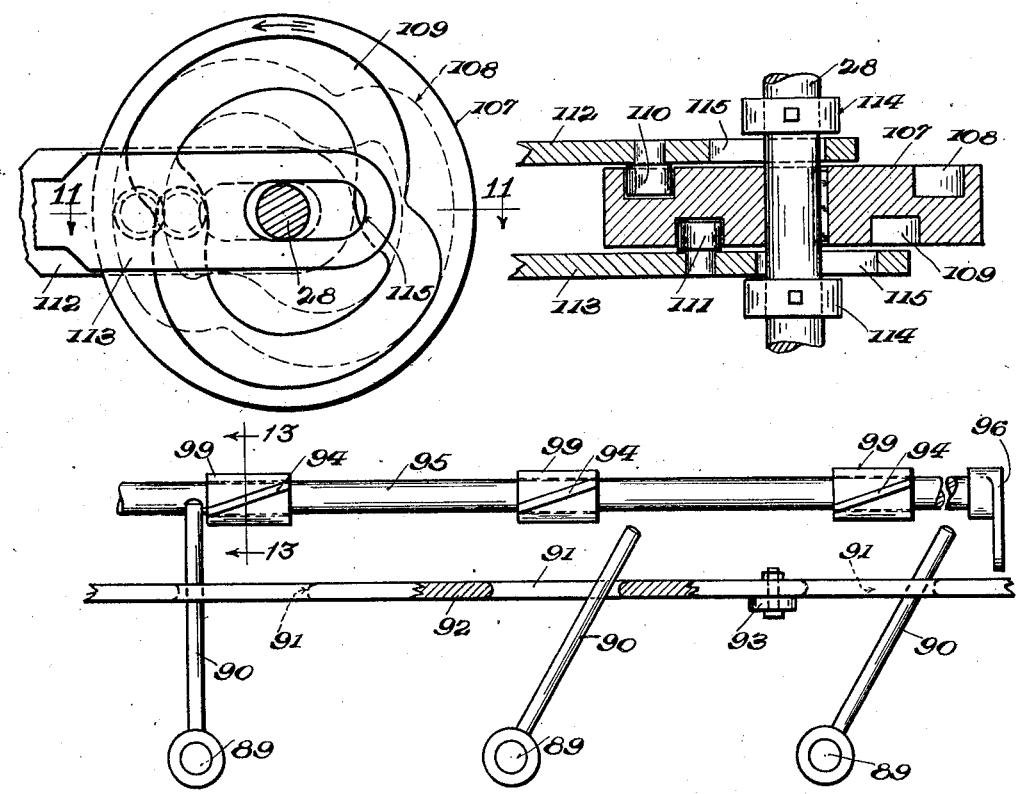

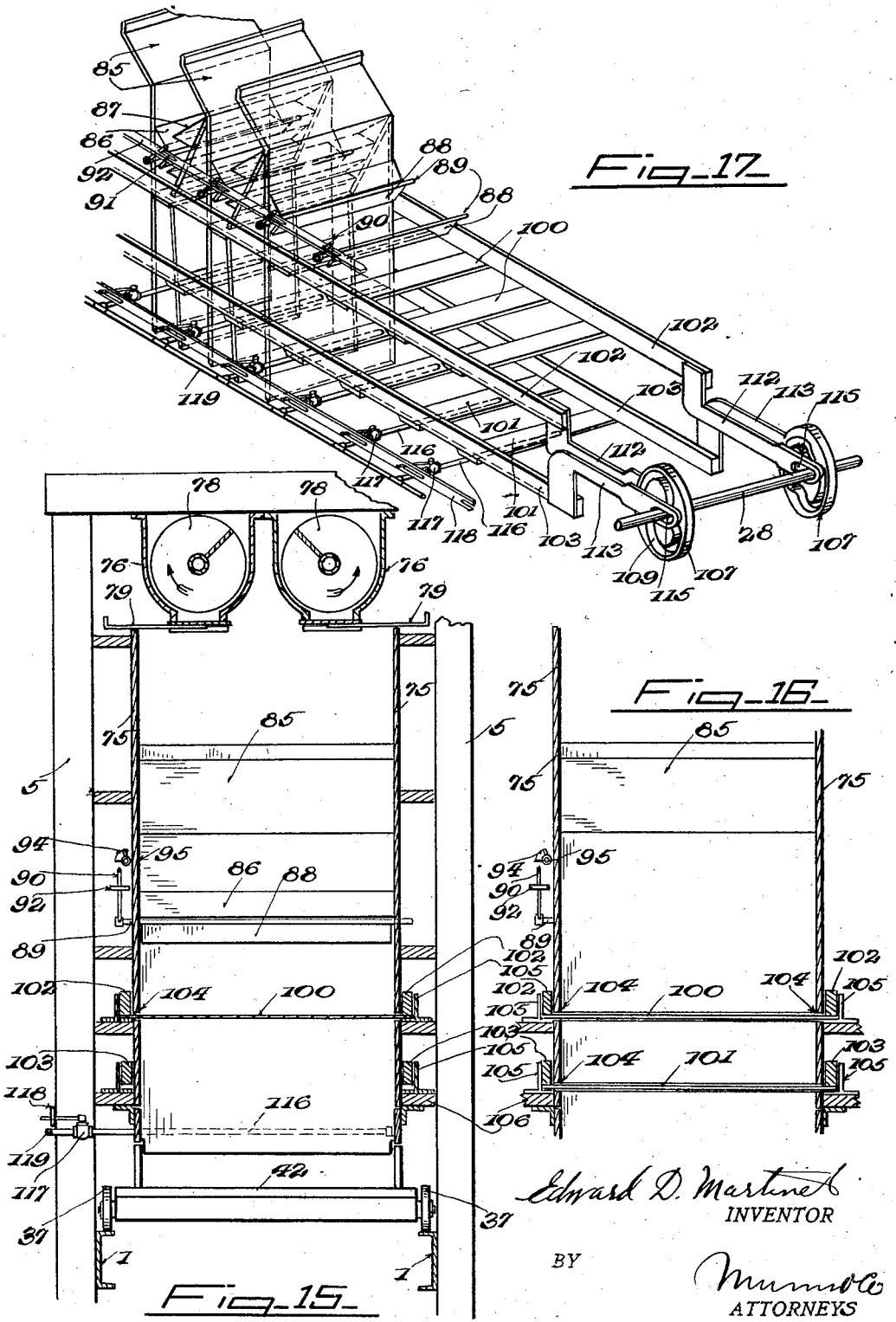

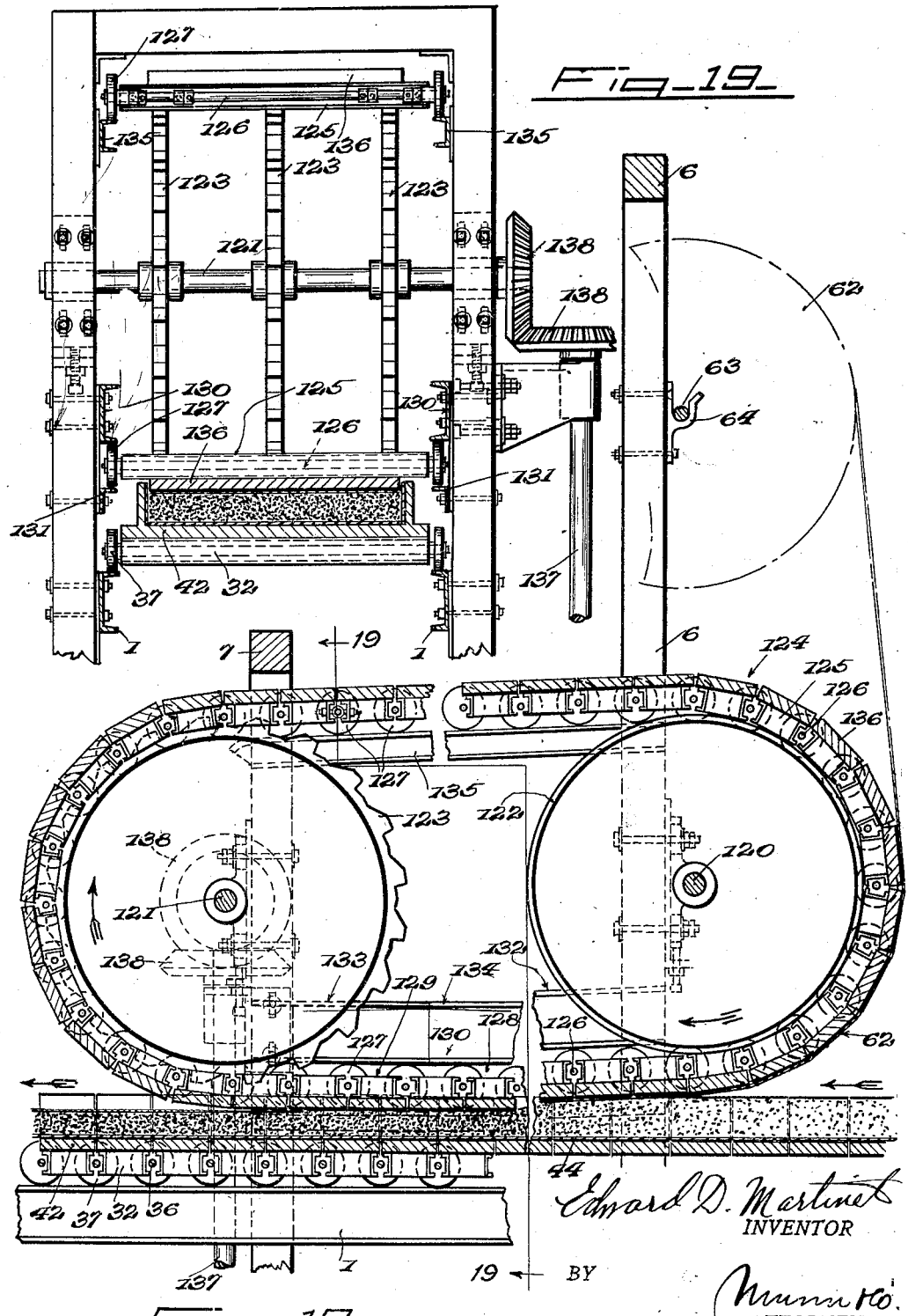

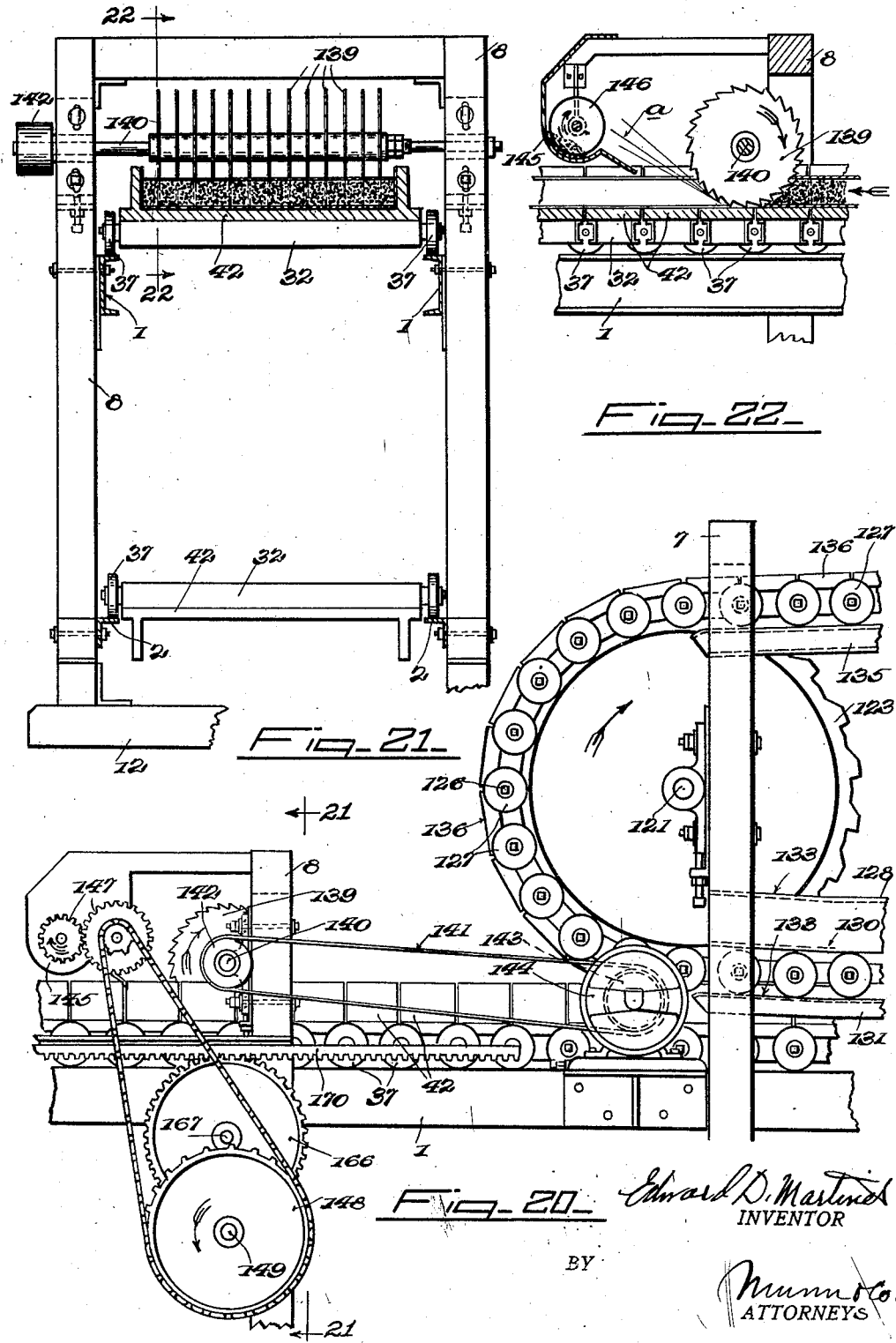

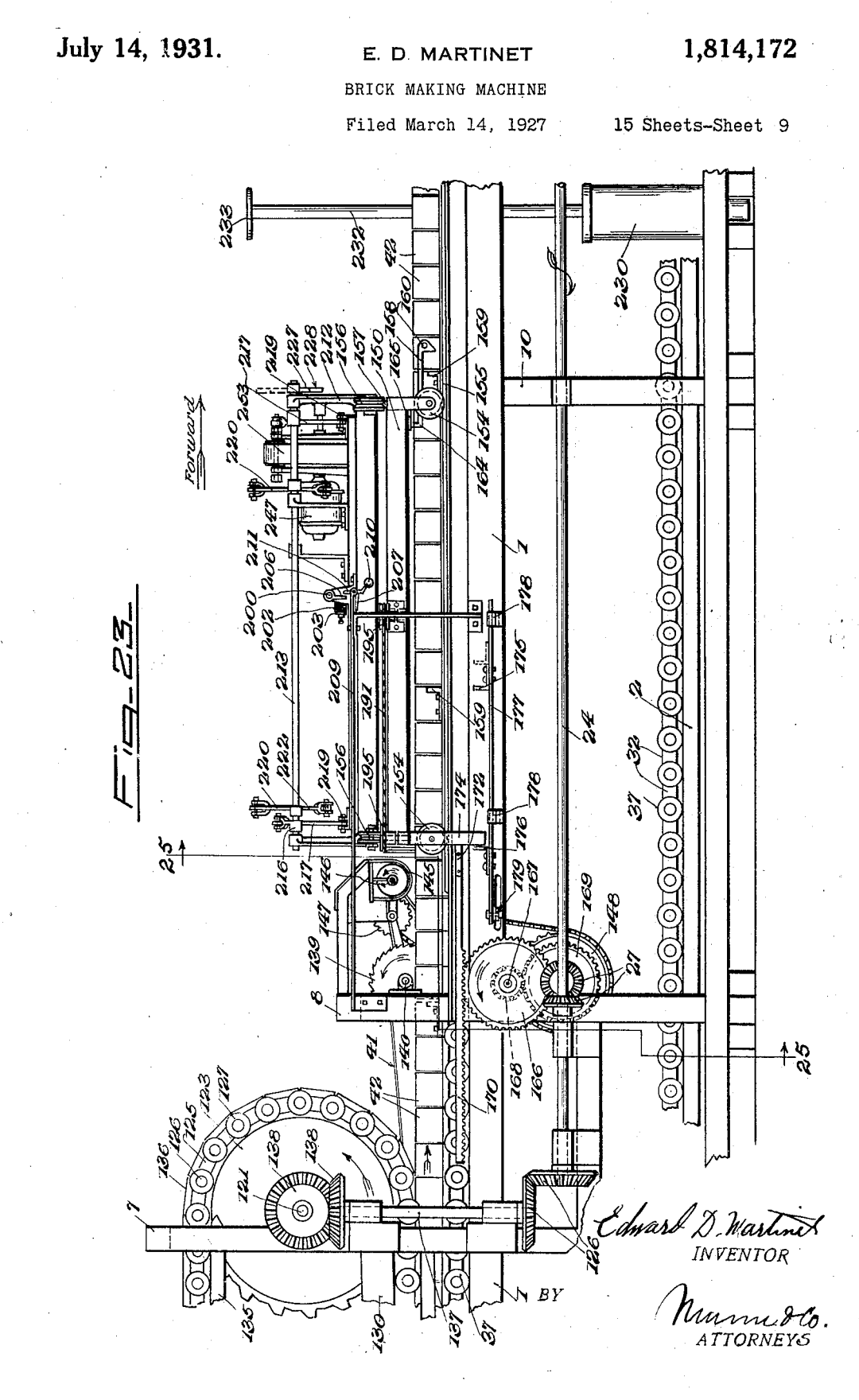

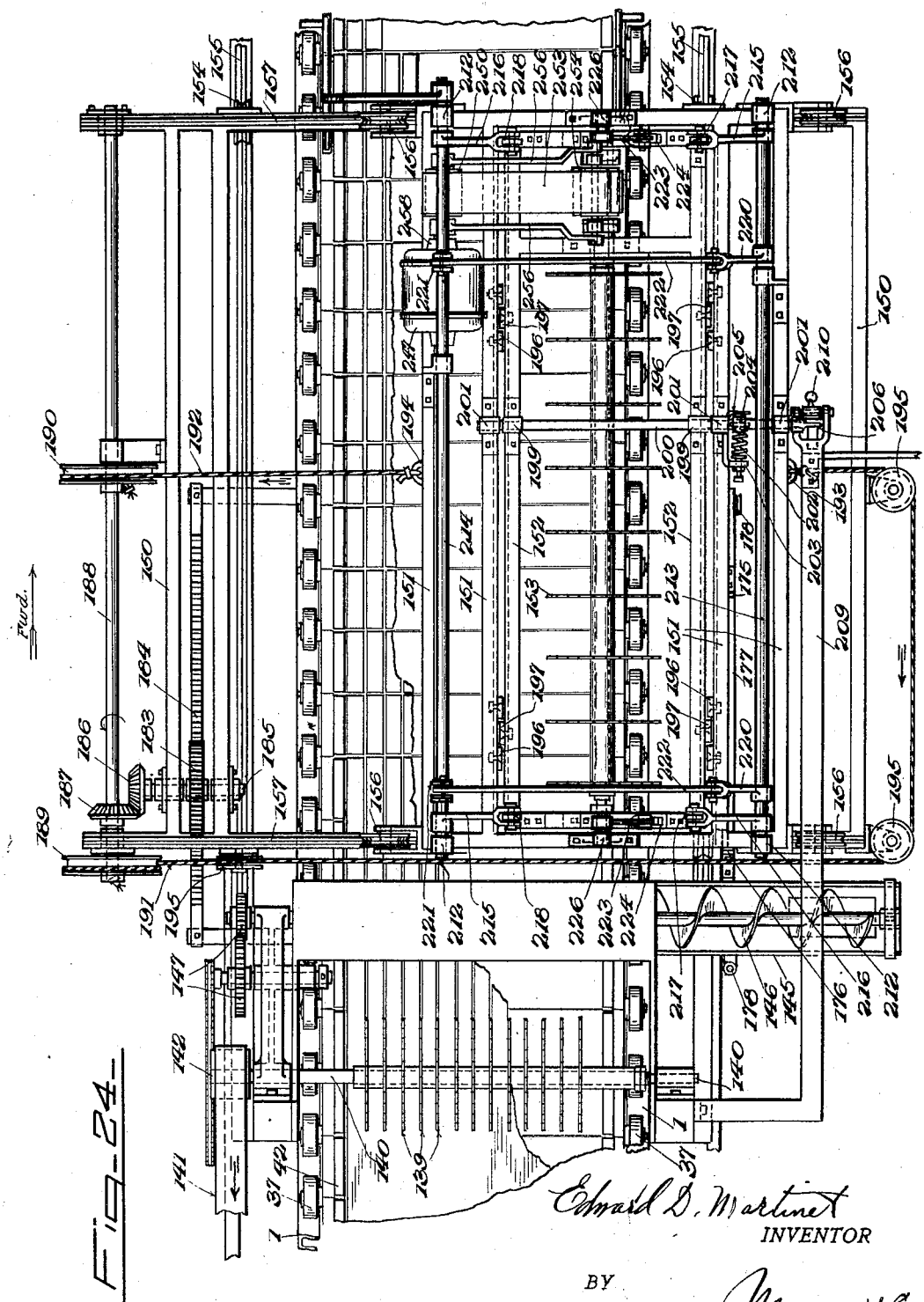

July 14, 1931. E. D. MARTINET 1,814,172
BRICK MAKING MACHINE
Filed March 14, 1927 15 Sheets-Sheet 11
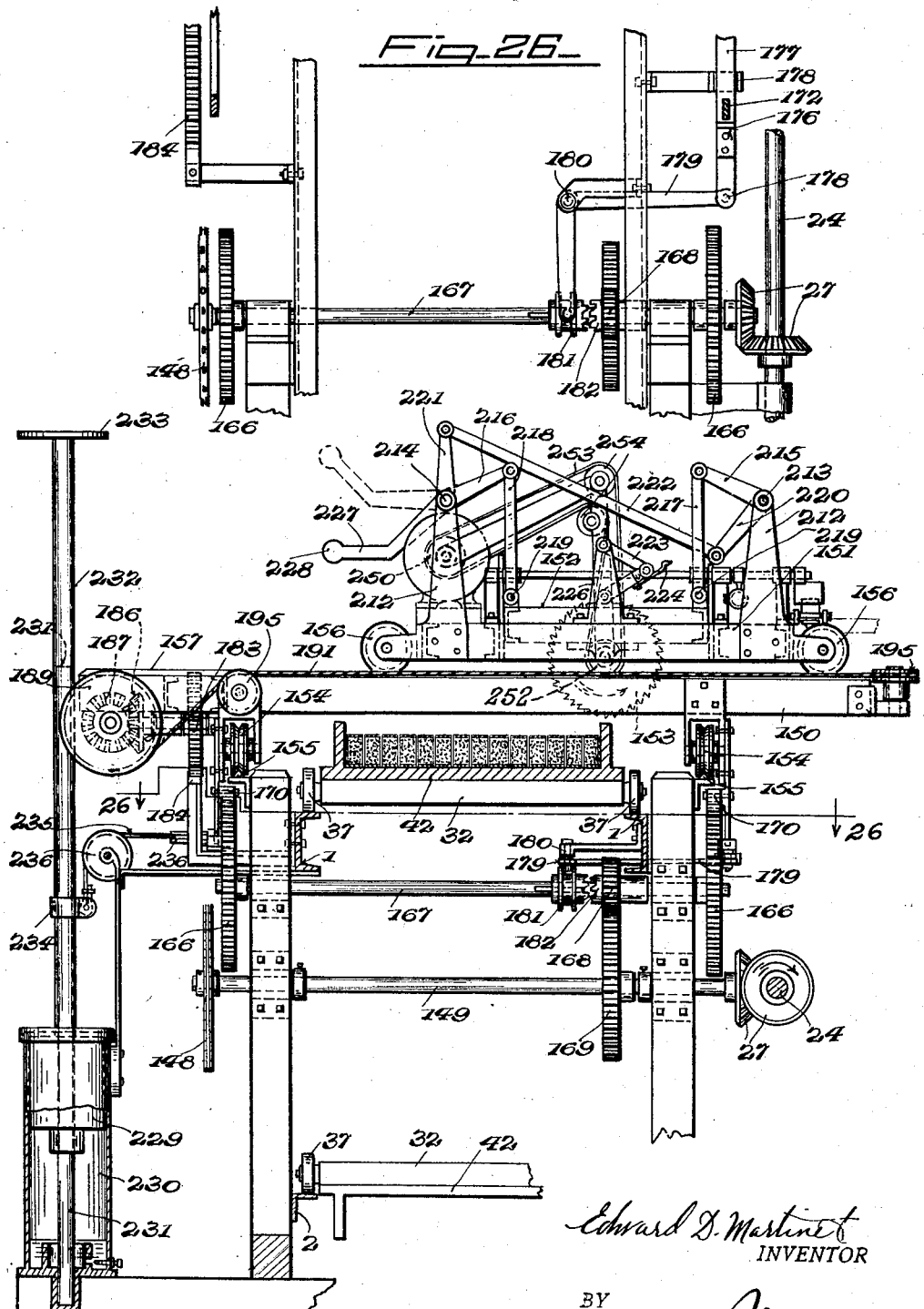

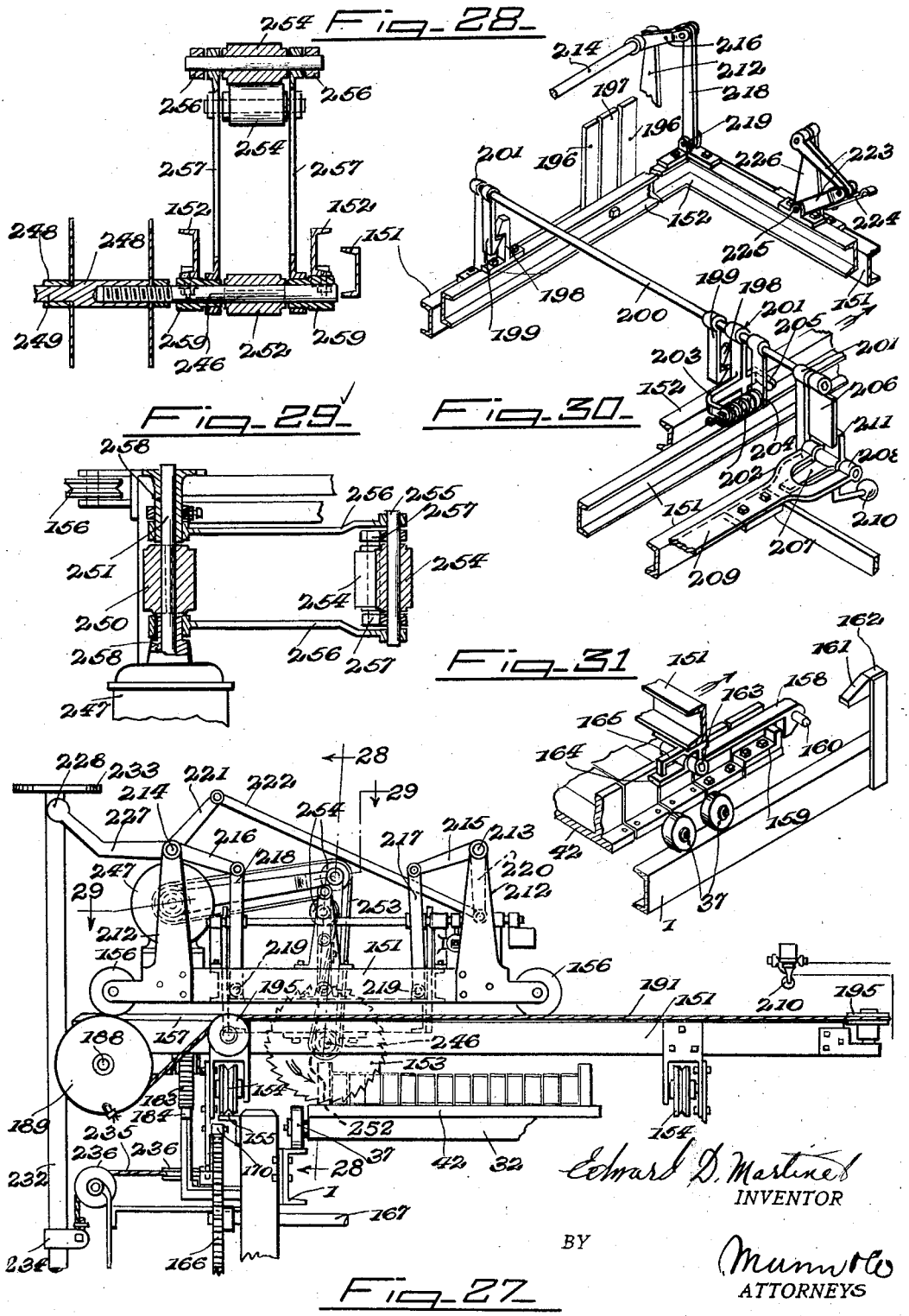

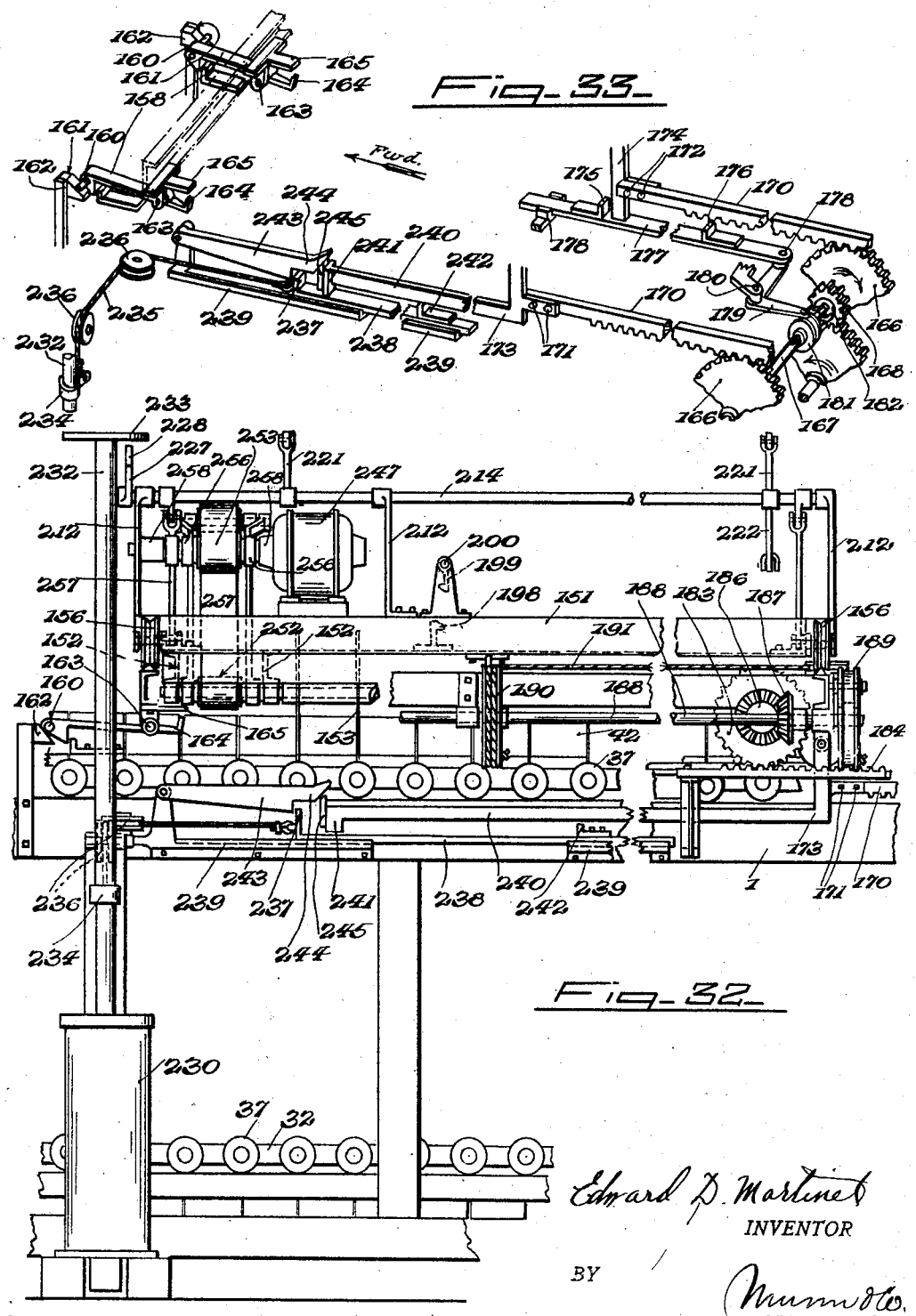

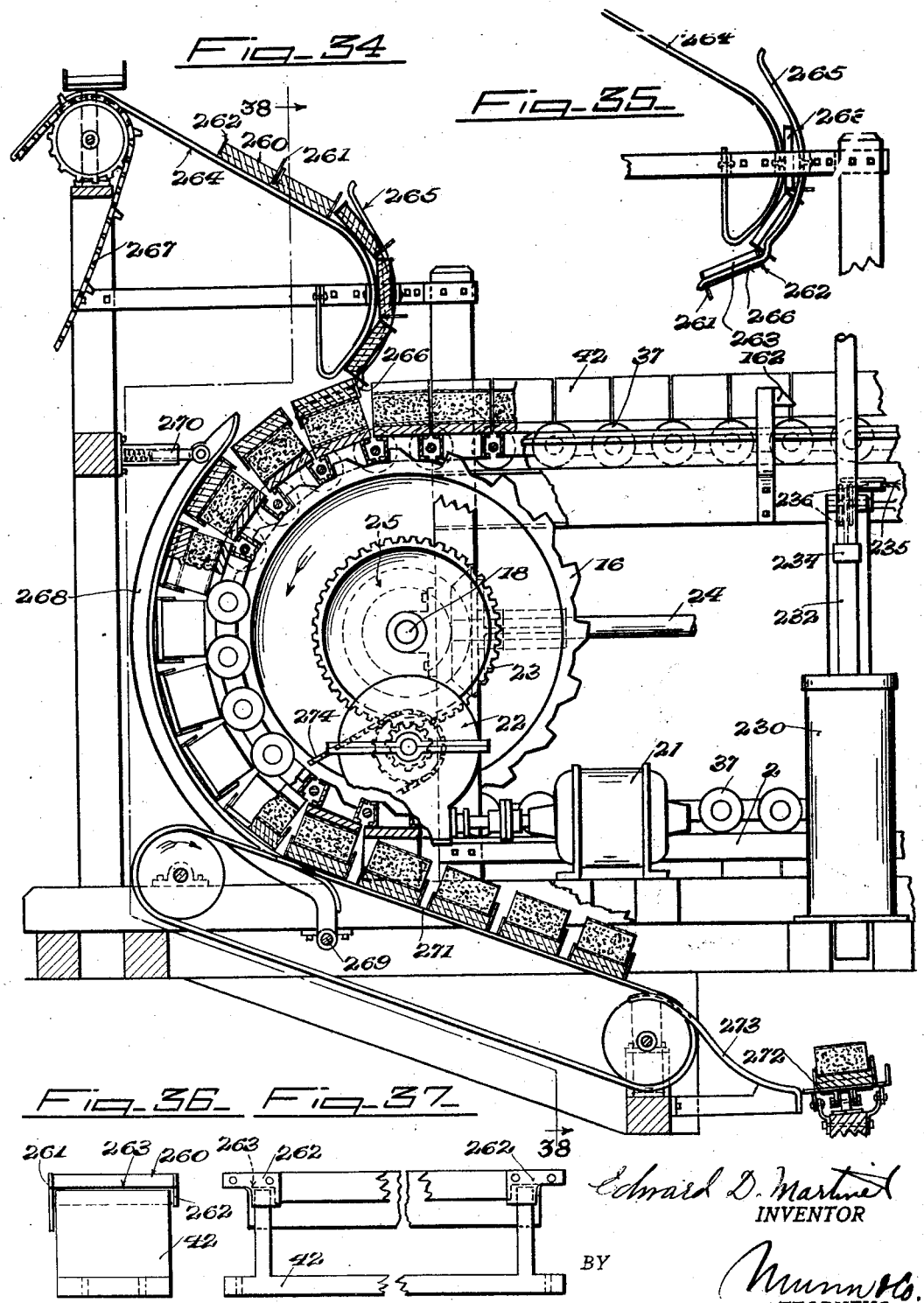

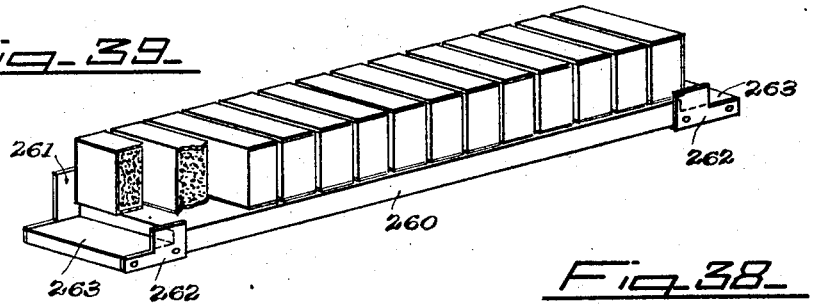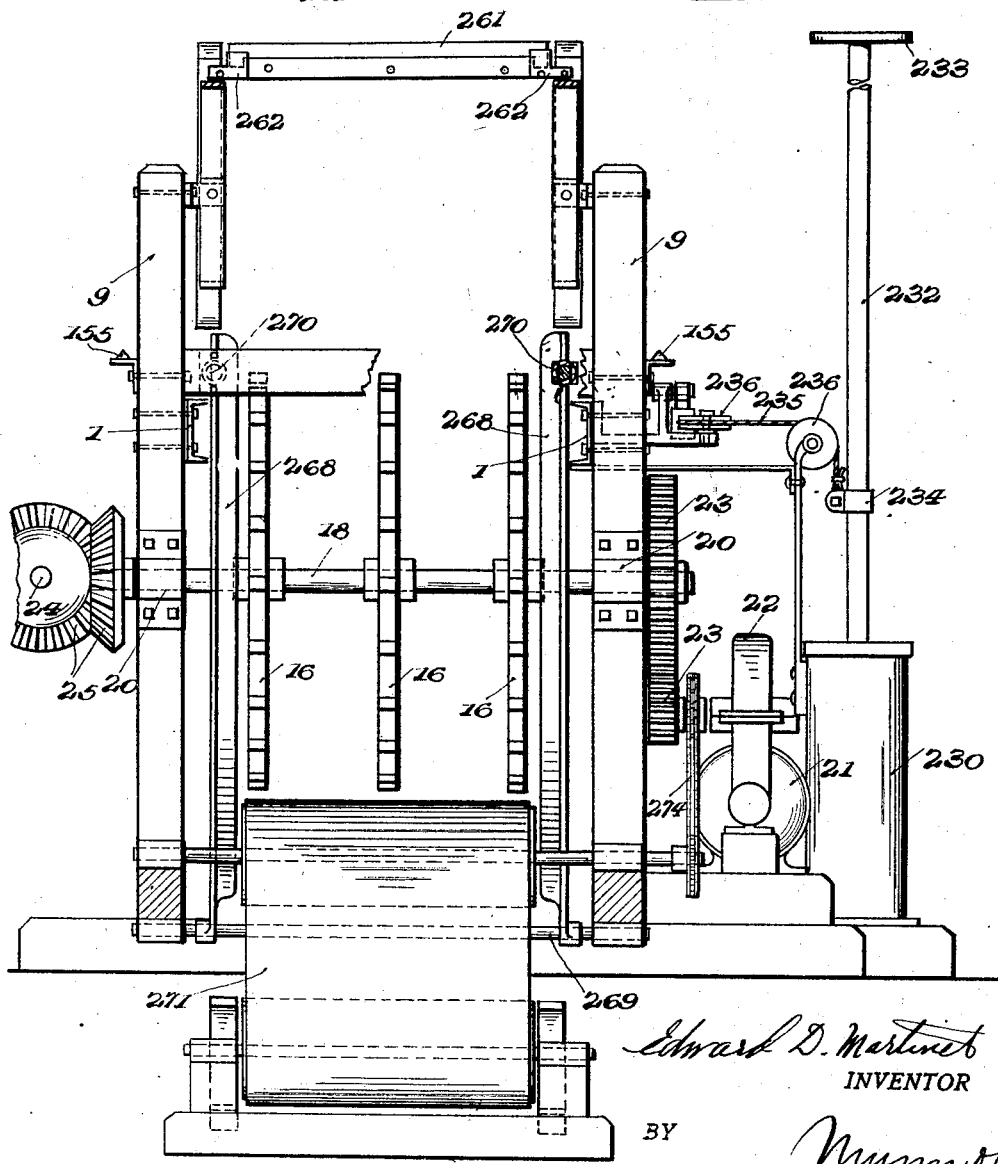

Patented July 14, 1931

1,814,172

UNITED STATES PATENT OFFICE

EDWARD D. MARTINET, OF LOS ANGELES, CALIFORNIA

BRICK MAKING MACHINE

Application filed March 14, 1927. Serial No. 175,317.

This invention relates to improvements in brick making machines, an object being to make possible the quantity production of such articles of manufacture as bricks, tiles and the like, the function of the machine, broadly stated, being to subject a ceramic dust introduced into the machine to such treatment that the resulting article is a brick of the desired form, dimensions and consistency ready for burning.

Another object of the invention is to provide a machine of the character described in which successive layers of a suitable ceramic dust are moistened to produce a plastic mass which, in turn, is subjected to pressure so that the desired consistency is attained and cut into sections or blocks of the required dimensions before being discharged from the machine in readiness for burning.

Another object of the invention is to provide a machine for producing a plastic mass having means for applying paper or other webbing to the bottom, top and sides of the plastic mass so that it will not stick to the matrices or compression elements.

Other objects and advantages appear in the following specification, reference being had to the accompanying drawings in which:—

Figure 1 is a side elevation of the improved brick making machine,

Figure 2 is a plan view thereof,

Figure 3 is a section of a portion of the endless travelling matrix taken on the line 3—3 of Figure 4, Figure 4 is a partial plan and sectional view showing the link members of said matrix, Figure 5 is a detail side elevation of a portion of the travelling matrix showing the link members which act as the carrier, Figure 6 is a detail cross section taken on the line 6—6 of Figure 5, Figure 7 is a side elevation of a portion of the head end of the machine, showing the paste container and a portion of the material distributor, Figure 8 is a plan view of the structure in Figure 7, Figure 9 is a detail end elevation of the matrix side alinement and paper rolls, Figure 10 is a detail elevation of one of the cams for actuating the distributor feed control, Figure 11 is a section on the line 11—11 of Figure 10, Figure 12 is a side elevation of the feed gate control, parts being shown in section, Figure 13 is a detail cross section taken on the line 13—13 of Figure 12, Figure 14 is a side elevation, partly in section, of the material distributor, the divisional partition and various gates being shown, Figure 15 is a vertical section taken on the line 15—15 of Figure 14, Figure 16 is a vertical section taken on the line 16—16 of Figure 14, Figure 17 is a perspective view of a portion of the distributor particularly showing the feed control gate with the actuating cams therefor, the stop-feed-gate and the water spraying system, Figure 18 is a sectional view of the compression element taken substantially on the line 18—18 of Figure 2, Figure 19 is a detail cross section taken substantially on the line 19—19 of Figure 18, Figure 20 is a detail side elevation of a portion of the machine showing the rip saw-gang and associated parts, as well as the adjacent end of the foregoing compression element, Figure 21 is a cross section taken on the line 21—21 of Figure 20, Figure 22 is a detail cross section taken on the line 22—22 of Figure 21, Figure 23 is a side elevation of the machine viewing the saw carriage positioned opposite to that in Figure 1, Figure 24 is a partial plan view of the machine principally showing the saw carriage in Figure 23, Figure 25 is a vertical section taken substantially on the line 25—25 of Figure 23 showing the cross cut saw-gang raised as at the beginning of a cross cut stroke, Figure 26 is a detail section taken substantially on the line 26—26 of Figure 25, Figure 27 is a cross section somewhat on the order of Figure 25 showing the cross cut saw-gang in the lowered position as at the end of a cross cut stroke, Figure 28 is a detail section taken substantially on the line 28—28 of Figure 27, Figure 29 is a section taken substantially on the line 29—29 of Figure 27, Figure 30 is a perspective view of portions of the cross cut saw-gang carriage and frame, Figure 31 is a detail perspective view of the actuating dog by which motion is imparted to the cross cut saw carriage from the travelling matrix to perform the cross cut stroke, Figure 32 is a detail side elevation of the cross cut saw carriage and parts associated therewith, depicted from the chosen side of general illustration, Figure 33 is a diagrammatic perspective view of the members associated with the cross cut saw carriage for bringing about the release and the return of the carriage, Figure 34 is a side elevation, partially in section, of the discharge end of the machine, Figure 35 is a detail side elevation of the rail by which the so-called "weatherboards" are guided into position, Figure 36 is an end elevation showing the relative assembly of a matrix unit and one of the foregoing "weatherboards", Figure 37 is a side elevation of the structure shown in Figure 36, Figure 38 is an elevation of the discharge end of the machine, the endless travelling matrix being omitted and parts being shown in section, Figure 39 is a perspective view of one of the "weatherboards" showing the finished product assembled thereupon.

In order that the construction and operation of the brick making machine may be readily understood, the following description is divided into a number of subjects concerning the main features, namely; the frame-work and matrix, the paper feed devices, the paste container, the material distributor, the compression element, the saw carriages, the discharge end of the machine and a summary of the operation.

*The frame-work and matrix*

The frame in Figures 1 and 2 comprises a pair of upper longitudinal channel rails 1 and a corresponding pair of angle rails 2. These rails are secured in parallel relationship by any suitable means which will impart to the frame-work the requisite strength for the support of the various functional units, said means including head posts 3, frame sections 4, 5, 6, 7, 8 and 9, and braces 10. The frame-work is supplemented by longitudinal bottom sills 11 and as many cross sills 12 as may be needed. Head and discharge end frames 13 and 14 are also provided.

The principal member of the machine comprises what is herein generally known as an endless travelling matrix upon which the ceramic dust or other material is discharged and by which such material is carried through the various stages leading to the completion of the bricks. This matrix is supported by sprocket wheels 15 and 16 at the head and discharge ends respectively of the machine. As shown in Figure 38, these sprocket wheels are in triple arrangement.

Shafts 17 and 18 support the sprocket wheels. These shafts are mounted in bearings 19 and 20 carried by the head posts 3 and frame section 9. Motion is imparted to the sprockets 16 at the discharge end of the machine by a motor 21, a suitable worm gear reducer 22 (Figure 38) and a train of spur gears 23. The gear train is connected with the sprocket shaft 18 (Figure 38) from which a counter shaft 24 is driven by means of bevel gears 25. The counter shaft drives the compression element by means of bevel gears 26, and the saw carriage by means of bevel gears 27. Power for the operation of the distributor cam shaft 28 (Figures 7 and 8) is derived from the head sprocket shaft 17 by means of a chain 29 connecting relatively large and small sprockets 30 and 31 on the respective shafts.

Links 32 (Figures 3 to 6) form part of the travelling matrix or carrier. These links comprise rectangular channel frames united by sets of cross members 33 which form longitudinally alining pockets 34 for receiving the teeth of the sprockets at the ends of the machine. The confronting channels of the long sides of the links or frames 32 house the eye-bolts, or bearings 35 by which the connecting hinge pins 36 are carried. Rollers 37 are freely rotatable upon the extremities of the hinge pins, being held in place by suitable means 38. The rollers run upon the upper and lower rails of the frame-work, and it is thus that the travelling carrier or matrix is supported during its passage from one end to the other of the machine.

The threaded shanks of the eye-bolts 35 extend in alternately opposite directions into the sides of the adjacent links and carry castellated nuts 39 by which wear can be effectively taken up and a true alignment of the parts arrived at. The rollers 37 have hubs sufficiently long to extend close to the nearest eye-bolts or bearings 35 thus preventing the rollers from rubbing against the sides of the carrier. The flanges of the links 32 are perforated at 40 to receive bolts 41 by which the matrix units 42 are secured upon the carrier. The matrices are preferably made of wood, although they may be made of other material, but in any case they are composed of a bottom member and ends near the extremities of the bottom member. The various matrices when assembled form a trough into which the material is discharged, but the material is prevented both from sticking to the matrix unit and from leaking out therebetween by a lining of paper, which is applied as presently appears.

The paper feed devices provide for the prevention of adherence of the material to the matrix, protect the upper surfaces of the plastic mass in both the rip and cross cutting operations, and facilitate the release of the product from the matrix. Attention is directed to Figures 1, 2, 7, 8 and 9 in which a paper roll 43 supplies the paper with which the upstanding flanges of the matrix unit 42 are lined. A roll 44 (Figures 1 and 3) supplies the paper with which the bottom of the matrix is lined. The roll 43 is wound with a double paper web the components or strands 45 and 46 of which (Figure 8) are spread apart after passage over idlers 47 by the sides of a spreader frame 48 which is fixed in rigid position in any desired manner. The divergent extremities of the spreader frame carry resilient pressers 49 which apply the paper to the sides of the matrix.

A pin 50 carries the roll 43. This pin is part of a carriage 51 which fits and is slidable upon an upstanding rail 52. The rail is mounted upon the head frame 13 upon which the spreader frame 48 is also mounted, the foregoing means for accomplishing the mounting comprising a bracket 53. The rope 54 of a weight 55 passes over a pulley 56 and is secured to a stud 57 on the side of the carriage 51 thus serving to pull the paper roll 43 over and against an alinement roller 58. This roller turns upon the pin 59 at one extremity of the rail 52, one side of the alinement roller being in line with the center of the spreader frame 48 for the purpose of effectively directing the paper strands 45 and 46 in a proper manner.

The roll 44 is carried by an axle 60 (Figure 1) mounted in suitable brackets 61 upon the frame-work. A paper roll 62 (Figures 1, 2 and 18) provides for surfacing the top side of the plastic mass so that it will not adhere to the compression element. The roll 62 is carried by an axle 63 mounted in brackets 64 upon the frame section 6. In addition to preventing the adherence of the ceramic dust after it has been converted into a plastic mass to the bottom and sides of the matrices the necessity for the paper lining is evident at the beginning of the endless carrier where the paper widths 44, 45 and 46 prevent the material from sifting through between the matrix units while in the dust state.

The paste container makes provision for securing the paper widths 45 and 46 to the upstanding ends of the matrix unit with a simple adhesive such as flour paste, so that these widths may not collapse prior to or during the discharge of the loose material into the carrier. This adhesive is discharged from a container 65 (Figures 1, 2, 7 and 8) through pipes 66 in which the rate of flow is controlled by valves 67, the adhesive dropping upon brushes 68 which apply it to the upper margins of the widths 45 and 46. The pasted widths are pressed against the matrix units by the resilient pressers 45 mentioned before.

An agitator 69 (Figure 8) driven by a gear train 70 keeps the paste at the proper consistency within the container 65. The gear train is driven from the distributor cam shaft by means of suitable bevel gearing 71 (Figure 8). Holders 72 support the brushes from the spreader frame 48, (Figure 8). The holders are adjustably held as at 73. The container 65 is supported upon the head frame 3 as at 74 (Figure 7).

The material distributor supplies the travelling carrier or matrix with previously prepared material, such material being discharged in successive batches until the desired depth of material is obtained, the various layers being sprayed with water thereby to produce a plastic mass. Reference is had mainly to Figures 14, 15, 16 and 17 which show the principal construction. The distributor casing 75 (Figures 14, 15 and 16) is surmounted by a pair of troughs 76 to which the material is supplied from an overhead bin 77 (Figure 14) and along which it is moved by augers 78. These are driven in any suitable manner. The discharge of the material is regulated by a plurality of slides 79 in the bottom of each of the troughs.

Vertical and angled partitions 80 and 81 arranged in alternation divide the lower part of the casing 75 into a plurality of material and spray compartments 82 and 83. The upper ends of the partitions 80 and 81 meet as shown whence they extend off at an angle as at 84 to define throats 85 directly beneath the foregoing slides 79 for the reception of the material as it is discharged from the troughs above. The various partitions are supplemented with deflectors 86 and 87 arranged in such manner that the entrance ends of the material compartments 82 are formed in the tortuous passages, an additional purpose of the arrangement being to insure the flow of the material in the downward direction, and to prevent packing of the material in transit.

Each material compartment 82 has a shutter 88 mounted beneath the deflectors 86 to swing across the passage and thus regulate the flow. The shafts 89 of the shutters project through the casing 75, and at one end carry arms 90 which occupy the slots 91 of a bar 92 suitably guided upon the side of the casing 75. The bar carries a handle 93 (Figures 12, 7 and 8) by which simultaneous closing of the shutters 88 may be had. When closed, the shutters 88 are held so by the engagement of latches 94 on a latch rod 95 with the then upstanding arms 90 (see the left end of Figure 12) of the shutters 88. The latch rod has a handle 96.

The latches 94 are turnable upon the rod 95, the amount of turning being limited by a pin 97 (Figure 13) in a slot 98 in the sleeve 99 of the respective latch. The latch 94 is sustained in a position in the path of the upper ends of the adjacent arm 90 by the engagement of one end of the slot 98 with the pin 97. Movement of the arm 90 to the erect position, as in closing the respective shutter 88, displaces the latch 94, the latch gravitating to its former position by virtue of the predominating weight of the lateral portion thereof (Fig. 13) after the arm 90 has passed to the left side thereof. The shutters 88 may be opened simultaneously (after a temporary shut-down) by lifting the handle 96 thereby simultaneously lifting all of the latches 94, and at the same time pulling the bar 92 to the right. It is also by means of the bar 92 and rod 95 that the shutters 88 may be opened consecutively beginning at the head of the machine thus synchronizing the deposit of layers of material with the matrix travel, and causing the layers to build up in the manner herein intended. This operation is carried out when starting the machine after a period of relatively long standing.

Consecutive opening of the shutters 88 is accomplished by a manual operation as follows:

Reference is had to Figures 12 and 14. To simultaneously close the shutters bar 92 is moved to the left; to simultaneously open the shutters bar 95 is turned by means of lever 96 releasing latches 99 and move bar 92 to the right. When the shutters are closed, by bar 92 being moved to the left, move the bar to the right as shown in Figure 12 when consecutive opening of the shutters is effected by releasing the latches 99 by hand, beginning at the right end as stated. The view in Figure 12 shows two levers 90 released, and the third, at left, in closed position to be opened by hand.

Feed gates 100 and 101, arranged in two rows, one above the other (Figures 14 and 17), cause the discharge of material in batches. There are two of the gates for each material compartment. They are carried by pairs of longitudinal and parallel rails 102, 103, these being secured to the gates at the extremities of the gates which project through and work in slots 104 (Figures 15 and 16) in the sides of the casing. Brackets 105 mounted upon spacers 106 between the sides of the casing 75 and the frame sections 4 and 5 (Figures 14 and 15) guide the rails 102, 103. The gates 100, 101 are set in relationship to each other so that one assumes a closing position across a compartment 82 while the other assumes an opening position. The reciprocating motion imparted to the rails produces an alternate opening and closing movement of the gate to discharge batches of the material as stated.

This motion occurs by action of a pair of disks 107 on the cam shaft 28. Each of these has cam grooves 108, 109 on opposite sides receiving the rollers 110, 111 (Figures 10 and 11) of arms 112, 113 extending from the respective rails 102, 103. The cam grooves produce the alternating motion mentioned, and are designed to give a slow opening and quick closing of the shutters with an interval of rest. The arms are held in place by collars 114 on the shaft 28, and the extremities of the arms have slots 115 receiving the shaft for guidance and support.

Successive batches or layers of material in the travelling matrix are wetted by a water spray from a plurality of pipes 116 which are suitably perforated on the under side. Each compartment has a valve 117 (see Figure 17), the handles of which have common connection with a bar 118 providing for the control of the flow of water from a common supply pipe 119. Mixture of the material and water is caused by the dragging and rolling effect upon the material by the lower extremities of the compartment partitions 80 and 81 which, as it is observed in Figure 14, are progressively shortened from front to rear of the machine thus providing increasing spaces between the lower edges of the partitions and the bottom of the matrix and allowing for the gradual building up of the plastic mass as successive batches are added.

*The compression element* compresses the plastic mass to the required compactness and dimension, the thickness illustrated in Figures 18 and 19 later equalling the width of the product (Figure 39) as presently appears. Shafts 120 and 121, journaled upon the frame sections 6 and 7 carry sets of drums 122 and sprockets 123 respectively (Figures 18 and 19) for the support and operation of the endless belt or compression element 124. This endless belt is constructed exactly like the travelling matrix with the exception that the upstanding ends 42 are omitted. The endless belt comprises links 125, hinge pins 126 which connect them, and rollers 127.

The shaft 120 occupies a position somewhat higher than that of the shaft 121 (Figure 18) thus producing a converging arrangement of the adjoining matrix and compression element at the entrance, there being a short portion 128 along which the compression element is made to run parallel with the matrix therebeneath in order to finish the surface of the plastic mass, while the extremity 129 moves in a divergent direction for the purpose of preventing the compression unit from marring the foregoing surface when being lifted therefrom upon the passage of said unit around the sprockets 123. The latter functions are produced by the form of a pair of lower guard rails 130, 131 which are upwardly inclined at the extremities as at 132 and 133 and horizontal in the middle as at 134. The rails 135 are upwardly inclined in the forward direction.

Reverting to the formation of the compression units, it is observed in Figure 18 that in addition to the elements 125 and 126 these units comprise plates 136. It is these that are equivalent to the units 42, mentioned before, but unlike such units do not have the upstanding ends. Paper from the roll 62 covers the faces of the compression plates insuring a smooth surface upon the plastic mass as it passes beneath the compression element. An upright shaft 137 has driving connection through bevel gears 138 with the sprocket shaft 121 of the compression element. The upright shaft is driven by gears 26 from the counter shaft 24 mentioned before.

*The saw carriages*

The compressed plastic material is cut lengthwise and crosswise reducing it into unit thickness and length. The first operation is performed by a gang of rip-saws 139 (Figures 20 to 24) assembled upon a mandrel 140 in suitably spaced relationship and driven by a belt 141 applied to pulleys 142 and 143 respectively on the mandrel and on the shaft of a motor 144 (Figure 20). The rip-saw gang is journaled upon the adjacent fixed frame section 8 which thus becomes one of the two saw carriages involved.

It is observed in Figures 20 and 22 that the rip-saws are assembled upon the mandrel 140 in the reverse position, that is to say the cut is performed by the backs of the teeth rather than by the points. This performs what may be known as a drag cut, it having been demonstrated that the saws are thus more readily and completely cleared of the cuttings composed of the wet plastic material. As these fly from the periphery of the saws as indicated at *a* (Figure 22) they are caught by a trough 145 whence they are conducted to one side of the machine by means of a conveyor 146. The conveyor is driven by gearing 147 (Figure 20) which in turn derives power from the sprocket 148 on a shaft 149 journaled upon the frame section 8 and in turn driven by the pinions 27 (Figures 2 and 23) previously described in connection with the counter shaft 24.

The movable saw carriage comprises a main frame 150 which is movable longitudinally of the travelling carrier in both directions, and an auxiliary frame 151 which is transversely movable in respect to both the carrier and the main frame. A frame 152 carries a gang of cross cut saws 153, said frame being both guided and vertically slidable upon the auxiliary frame 151 by elements carried by the frame 151. Four rollers 154 with V-shaped grooves support the main frame 150, these rollers running upon longitudinal tracks 155 (Figures 23, 25 and 27). Similar rollers 156 support the auxiliary frame 151 and rest upon transverse rails 157 of the main frame 151.

The main saw carriage frame 150 moves forward and backward upon the framework, varying from the position shown in Figures 1, 2, 23 and 24 wherein the main frame is shown at the end of the return stroke, to that shown in Figures 27 and 32 in which the main frame is at the end of the forward stroke. The forward stroke is produced by the engagement of an actuating dog 158 on the saw carriage frame (Figures 23 and 31) with a lug 159 on the travelling carrier. As seen in Figure 23, the travelling carrier is equipped with a number of the lugs 159 throughout its length spaced equi-distantly apart, the periodic engagement of the successive lugs with the latch causing the repeated forward stroke of the saw carriage frame.

Forward motion of the frame is automatically stopped at the required time by the riding-up action of a lateral pin 160 (Figures 31 and 32) upon the beveled approach 161 of a fixed ramp 162. This action swings the dog 158 upon its pivot 163, causing disengagement of the dog with the adjacent lug, permitting the lug to pass on but causing the aforesaid stopping of the frame. Gravitation of the head of the dog 158 is limited by the engagement of the extended end 164 with a short projection 165 on the main frame. The foregoing dog and associated parts are provided on each side of the machine (Figure 33) so that there may be no uneven pull upon the frame.

The return stroke of the saw carriage frame is effected by the operation of a clutch gear train composed of a pair of gears 166 fixed on a clutch shaft 167 (Figures 23, 25, 26 and 33), a pinion 168 on the frame shaft and a driver 159 on the shaft 149. The latter is conveniently driven from the counter shaft 24. The gears 166 continuously mesh with racks 170 suitably fixed at 171 and 172 to brackets 173 and 174, respectively of the main frame as is plainly shown in Figure 33 and by comparison of Figures 23 and 32. The bracket 174 serves as an automatic actuator in that it moves between and engages with the lugs 175 and 176 (Figure 23) to start and stop the gear 30. These lugs are carried by a slide bar 177, mounted upon fixed supports 178 on the adjacent the outstanding channel rail 1.

One end of the slide bar 177 has pivotal connection at 178 (Figures 26 and 33) with one arm of a bell crank 179 which in turn is pivoted at 180 on a bracket carried by the framework. The other arm of the bell crank is arranged to slide a clutch collar 181 along the clutch shaft 167 (Figure 25), the rocking of the bell crank resulting in the disengagement of the clutch collar from the clutch face 182 when the bracket 174 strikes the lug 176, stopping rotation of the shaft 167 and ending the return movement of the saw carriage.

Upon nearing the end of the forward movement of the saw carriage, the bracket 174 engages the starting lug 175, moving it from the full to the dotted line position in Figure 23 and performing the reverse operation of the bell crank 179 (Figure 26) whereupon the clutch collar 181 and clutch face 182 are re-engaged and the return of the saw carriage again initiated.

Simultaneously with the foregoing forward motion of the main frame 150 the auxiliary frame 151 traverses the main frame from the side shown in Figures 24 and 25 to the side shown in Figure 27 to perform the cross cut. Necessary power is derived from the rotation which a gear 183 (Figure 24) is compelled to perform by virtue of engagement with and travel over a stationary rack 184. The gear is carried by a shaft 185 which is journaled upon the main frame. A pinion 186 on said shaft meshes with a pinion 187 on a shaft 188 carrying pulleys 189 and 190.

Flexible elements 191 and 192 (for example, ropes) connect the pulleys with opposite sides of the auxiliary frame as indicated at 193 and 194, the flexible element 191 being longer is trained over and supported by a suitable number of idlers 195. The flexible elements are secured to opposite sides of the peripheries of the respective pulleys 189, 190 so that rotation of the pulley shaft 188 in the counter clock-wise direction (the observer facing the pulley 189 in Figure 24) will cause the auxiliary frame to move across the machine in one direction during forward motion of the saw carriage and that clock-wise rotation of the shaft 188 will cause movement of the auxiliary frame in the opposite direction during the return motion of the saw carriage. These actions are obviously effected by the appropriate winding up and unwinding of the flexible elements upon the pulleys 189, 190 as the reader will understand.

The path of travel of the saws 153 in respect to the travelling carrier, as a resultant of the simultaneous forward and transverse movements of the main and auxiliary frames 150 and 151, is diagonal, but inasmuch as the main frame is virtually locked in connection with the carrier for a period of its forward travel, it follows that the cut of the saws 153 will be at right angles to the longitudinal axis of the machine.

Vertical cleats 196 and 197 guide the saw frame 152 in its vertical movement in respect to the auxiliary frame 151. The former are arranged in pairs and are carried by the auxiliary frame (Figures 24 and 30), the latter being carried by the saw frame 152 and situated between said pairs. Pairs of latches 198 and 199 respectively fixed upon the saw frame 152 (Figure 30) and carried by a latch rod 200 supports the saw frame in the elevated position (Figure 25) as at the beginning of a cross stroke.

The latch rod is journaled in bearings 201 on the auxiliary frame 151. A spring 202 (Figure 30), situated between a bent end of an arm 203 and a depending plate 204 on the latch rod tends to keep the latches 198, 199 in engagement, the action of the spring being limited by the stop 205 formed on the opposite end of the foregoing arm 203. This engagement also establishes the position of a release plate 206 at the outer extremity of the latch rod. A dog 207, pivoted at 208 upon a fixed bracket 209 and weighted at 210 carries an upstanding detent 211 located in the path of the plate 206. Forward motion of the saw carriage, as when one of the lugs 159 (Figure 23) engages the actuating dog 158, causes rocking of the latch rod 200 by virtue of the rigid holding of the dog 207, and the release of the latches 198 from the latches 199 so that the saw frame 152 may drop.

Standards 212 fixed upon the auxiliary frame 151 (Figures 24, 25, 27 and 30) provide bearings for supporting the shafts 213 and 214 carrying arms 215, 216 for the connection of links 217, 218 by which the saw frame is held extended at 219. Other arms 220, 221 upon the respective shafts 213, 214 are connected by reach rods 222 to synchronize the turning movement of one shaft with that of the other and thus lower and raise the saw frame in an even manner.

Toggles 223 situated in the center at the longitudinal extremities limit the extent of drop of the saw frame by virtue of the extension of the toggle arms (Figure 27), and ease the force of the drop by virtue of engagement of the free end of a leaf spring 224 (Figures 25, 27 and 30) on one of the toggle arms with the other toggle arm. This spring also serves to "break" the toggle arms, that is to say throw the middle center out of alinement, preparatory to the lifting of the saw frame prior to return motion of the saw carriage. The toggle arms are connected to each other in the center and respectively to the saw frame at 225 at the extremity of one of the arms and to the standards 226 on the auxiliary frame 151 at the extremity of the other arm. The shaft 214 has a lever 227 through which the saw frame is raised as presently appears. A weight 229 operable in the dash pot 230, performs the foregoing raising of the saw frame 152. The act of raising occurs at the end of the cross cut (Figure 27) whereupon the lever 227 is moved from the full line position to a depressed position like that shown in full lines in Figure 25. A stem 231 (Figure 25), suitably fixed in reference to the dash pot, provides a guide upon which the sleeve 232 of the weight 229 is slidable. The upper end of the sleeve carries a depressor plate 233. A clamp 234 on the sleeve 232 provides a place of attachment for one end of a cable 235 which is trained over pulleys 236 prior to attachment to the heel 237 of a sliding bar 238 (Figure 32).

Guides 239 (Figures 32 and 33), fixed upon the main frame, support the bar 238 for sliding movement. The previously described bracket 173 has a forward extension 240 terminating in a head 241 which is engageable with lug 242 on the slide bar 238 at a time sufficiently near to the end of the return of the saw carriage to pull the slide bar 238, weight 229 and depressor plate 233 to the position that they now assume in Figures 25 and 32. This position is held by a latch 243 which gravitates into engaging position behind the heel 237. An extension 244 of the latch is beveled as shown (Figure 32) to be engaged and raised by a beveled lip 245 on the head 241 at the end of the forward stroke of the saw carriage, thereby releasing the heel 237 and the slide bar, permitting dropping of the weight 229 (Figure 25) in the dash pot and depression of the lever 227 then in position to meet the depressor plate 233 (Figure 32) into the full line position (Figure 25) already described.

Power for driving the mandrel 246 is furnished by an electric motor 247, the mandrel having general reference to the driving shaft of the cross cut saws 153, but the mandrel does not extend from end to end of the saw gang inasmuch as the saws are assembled upon and spaced by the elements 248 shown in Figure 28. Each element has a reduced portion 249 which fits into the bore of the element 248 adjacent the arrangement serving to fix the successive saws between the shoulder and end of the various elements as may be readily understood from Figure 28. A pulley 250 on the shaft 251 of the motor (Figure 29) drives the pulley 252 on the saw mandrel by means of a belt 253.

The belt passes over idlers 254, one of these being revoluble upon the connecting hinge pin 255 of pairs of arms 256, 257, the other being journaled upon the latter pairs of arms as shown. The remaining ends of the arms 256 are journaled upon hubs 258 in which the motor shaft rotates. The remaining ends of the arm 257 are journaled upon the hub extension of bearing 259 (Figure 28) which supports the mandrel 246. The bearings are fixed to the saw frame 152, and it follows that as the saw frame is lowered and raised the pairs of arms 256, 257 will bend at the joint 255 to accompany the driving belt to the varying positions of the saw gang.

*The discharge end of the machine* has provision for separating the plastic material, now divided into brick size by virtue of the foregoing rip and cross cut sawing operations, and applying what is herein known as weatherboards upon which the moist bricks remain for a time until ready for firing. Principal reference is had to Figures 34 to 39, inclusive. The so-called weatherboard 260 is long enough to receive a cross row of bricks (Figure 39). It has a thin metallic strip 261 along the leading edge for the purpose of keeping the bricks in position when travelling around the discharge sprockets 16 (Figure 34), and short metallic lugs 262 at the ends of the opposite edge. Both the lugs and strip 261 are formed to agree with the reduced extremities 263 of the weatherboard, these extremities being designed to pass between guide rails 264, 265 (Figures 34 and 35) into position upon the rows of bricks mentioned.

The lugs 262 perform a function similar to that of the metallic strip 261 in that they engage the edges of the upstanding end of the matrix unit 42 and thus prevent slipping of the combined weatherboard and bricks in reference to the unit of the travelling carrier. The guide rail 265 has an off-set 266 upon which the weatherboard drops prior to superimposition upon a row of bricks, the arrangement being such that the projecting edges of the strip 261 will be engaged by the upstanding end of the matrix unit immediately below the weatherboard resting on the rail 265 in readiness to enter upon the off-set 266 so that the act of moving the weatherboard into the off-set and both upon the upper edges of the matrix ends and upon the particular row of bricks becomes one act. Figures 36 and 37 show how the strip 261 and the short lugs 262 engage the matrix ends, and also show how the reduced extremities 263 of the weatherboard 260 rest upon the matrix ends thus relieving the plastic bricks of the weight of the weatherboard.

An elevator 267 (Figure 34) deposits the weatherboards upon the guide rail 264, the weatherboards being taken up from a suitably provided place. The weatherboards are held in the aforesaid engagement with the outer edges of the matrix unit ends by followers 268 (Figures 34 and 38) thus preventing displacement while the bricks pass around the circumference of the sprocket 16. The followers are curved. They are hinged at the bottom upon a common shaft 269. Spring pressed plungers 270 are pivotally connected with the upper ends, the purpose being to keep the followers pressed toward the weatherboards as they slide around therebeneath. A conveyor 271 conveys the weatherboards and bricks to a disposal conveyor 272, a slide 273 being interposed. The conveyor 271 is driven by a chain 274 (Figures 34 and 38) from the shaft of the worm gear lever 22.

*A summary of the operation*

The motor 21 (Figures 2, 34 and 38) drives the travelling carrier or matrix, composed of the links 32, wheel 37 and matrix unit 42, continuously while the machine is in operation. The plastic mass from which the bricks are made is formed upon the travelling carrier, and inasmuch as the matrix units are separate from each other it becomes necessary to line the carrier not only for the purpose of preventing the dry ceramic dust from sifting through but also prevent the plastic mass from sticking.

To the latter ends the paper roll 43 (Figures 2 and 8) provides a lining for the sides of the travelling carrier, in other words the paper strands 45 and 46 are applied to the upstanding ends of the matrix units, while the roll 44 supplies the paper with which the bottom of the carrier is lined. The roll 62 (Figures 1 and 19) supplies the paper with which the bottom of the compression element 124 is covered so that the spaces between the compression plates 136 may leave no mark on the surface of the plastic material. Inasmuch as this paper adheres to the plastic material it follows that the plastic material is covered on all sides prior to the cutting operations. The adhering paper also protects the plastic material during cutting.

The function of the material distributor is to apply successive layers of dry ceramic dust upon the carrier as it travels beneath the distributor, the successive layers being moistened with a water spray thereby to form the plastic mass. It has been pointed out that the shutters 88 (Figure 14) may all be either simultaneously opened or closed, or they may be opened consecutively, beginning at the right end of the casing 75, as in starting the operation of the machine after a prolonged shut-down. The necessity for this is apparent: the consecutive opening of the shutters 88 will cause the depositing of normal layers of dust upon the travelling carrier in the successive compartments 82, the effect being the building up of the material in agreement with the carrier travel. If all of the shutters 88 were opened simultaneously under the conditions named, the amount of ceramic dust in practically all of the compartments (excepting perhaps several at the right) would be of insufficient depth to make up the required thickness and would therefore be treated as waste at the discharge end of the machine.

As soon as the plastic mass reaches the element 124 it is subjected to compression, the design of the compression element 124 being such as to accomplish this purpose (Figure 18). The compression element first goes down a gradual decline thus applying the pressure to the plastic mass gradually, whereupon the travel is parallel with the carrier for a short distance as at 128, finally passing up a short incline as at the extremity 129, thus taking off from the plastic mass without leaving any mark as would be the case when the compression plates 136 pass around the sprockets 123. The saw carriages (Figures 23, 24 and 32) divide the plastic mass into brick size. Both the rip saws 139 and cross cut saws 153 are assembled upon the respective mandrels to run backward. This arrangement has the advantage of more readily cleaning the saw kerfs of cuttings and produces clean cuts through the mass.

The rip saws 139 are third to act. These cut the plastic mass longitudinally, producing what ultimately becomes the thickness of the brick. The frame section 8 of the machine by which the rip saw gang is supported is herein known as the stationary saw carriage. Inasmuch as the saw gang 153 must perform the cross cutting operation upon the longitudinally moving mass, it follows that the main and auxiliary frames 150 and 151 must be rendered movable, and these are therefore herein known as the movable saw carriages.

In order that the cross cut of the saws 153 may be true, the motion of the main frame 150 must be coordinated with the travelling carrier, and this is done by the engagement of one of the lugs 159 on the carrier in the actuating dog 158 on the frame 150. As soon as the main frame 150 is set in motion the auxiliary frame 151 is made to traverse the main frame by virtue of the action of the gear 183 upon the stationary rack 184.

The resultant winding and unwinding of the flexible elements 192 and 191 (Figure 24) on and off the pulleys 190 and 189 respectively pulls the auxiliary frame across to perform the cut.

Normally the cross cut saw frame 152 hangs suspended from the latches 199 (Figures 25 and 30) thus holding the saws 153 elevated. But as soon as the main frame 150 begins the foregoing forward motion the returning action of the upstanding detent 211 upon the release plate 206 turns the rod 200 and releases the saw frame so that it drops into operative position. Thus it remains during the cross cut. Prior to the return movement of the auxiliary frame 151 it becomes necessary to again raise the cross cut saw gang. This is accomplished by the action of the weight 229 (Figure 25) upon the raising lever 227 through the depressor plate 233. The release of the weight occurs when the main frame 150 reaches the end of the forward movement, at which time the lip 245 of the forward extension 240 (Figure 33) raises the latch 243 and permits the bar 238 to slide back and the weight to drop in the dash pot 230.

The end of the foregoing movement of the main frame 150 is also the occasion of the engagement of the actuator bracket 174 (Figure 23) with the lug 175 which, at this time, is moved from the full to the dotted line position. The resulting forward sliding of the bar 177 rocks the bell crank 179 (Figures 26 and 33) in the counter clockwise direction, causing the engagement of the clutch elements 181, 182 and the setting in motion of the clutch shaft 167 for the return of the main frame 150 through operation of the gears 166 (Figures 23 and 25) against the racks 170. As soon as the actuator bracket 174 re-engages the lug 176 the resulting reverse action disconnects the clutch elements so that the action of the gears 166 stop.

The nine cross cut saws 153 cut nine rows of bricks, the foregoing cross cutting operation being performed during the length of travel of the carrier equivalent to the length of four bricks. The return movement of the auxiliary saw frame 151 is accomplished during a like period, namely, a time interval equivalent to the length of four bricks, leaving a time interval equal to the length of one brick for the functions of dropping and raising the cross cut saw frame 152. The parts are so timed and adjusted that the saws 153 will pass through the spaces between the upstanding ends of the matrix units 42, this obviously being necessary to avoid cutting into the matrix unit.

The paper adhering to certain surfaces of the bricks formed in the foregoing operations (Figure 39) is destroyed during firing of the bricks. Figure 39 shows a row of the blocks in position upon a weatherboard 260. Figure 34 shows how the weatherboards are brought around into position upon the upstanding ends of the matrix units and upon the rows of wet bricks as they begin to pass around the discharge sprockets 16. The weatherboards are held in proper position by the curved followers 268. The conveyor 271 carries the weatherboards to the slide 273 by which they are guided to the disposal conveyor 272.

While the construction and arrangement of the improved brick making machine is that of a generally preferred form, obviously modification and changes may be made without departing from the spirit of the invention or scope of the claims.

I claim:—

1. A machine of the character described comprising a carrier, means for discharging dry material upon the carrier and levelling the material at successively varying heights from the bottom of the carrier, means for moving the carrier in respect to the discharge means thereby spreading the material in successively superimposed layers, and means applying liquid to the successive layers in spray form to produce a plastic mass.

2. A machine of the character described comprising a travelling carrier, means for delivering the dry component of a plastic mass to the carrier, said means including a plurality of elements stopping at increasing distances from the bottom of the carrier, thereby levelling said component at progressively increasing depths between said elements and superimposing successive layers of the component upon the carrier and upon previously formed layers thereupon, and means for wetting the successive layers as they are leveled out, thus producing a loosely formed plastic mass.

3. A machine of the character described comprising a travelling carrier, means for delivering the dry component of a plastic mass to the carrier, said means including pairs of partitions defining compartments from which the dry component is discharged, said pairs of partitions being successively shorter to increase the space therebetween and the bottom of the carrier thereby levelling said component off at varying heights and setting one layer upon another, and means situated between the pairs of partitions spraying the various layers as they are are superimposed upon each other thus forming a plastic mass.

4. A machine of the character described comprising a carrier, means to impart travelling motion to the carrier, means to deliver ceramic dust to the carrier, said means including a plurality of partitions defining compartments through which the dust passes, shutters in each of the compartments being mounted to swing through closing and opening movements, and means to swing the shutters consecutively upon the opening movements to synchronize the passage of dust through the compartments and deposit thereof upon the travelling carrier with the travelling movement of the carrier for the purpose described.

5. A machine of the character described comprising a travelling carrier, a throat through which a mass is discharged upon said carrier, a shutter situated in the said throat, an arm by which the shutter is movable to opening and closing positions, means by which the arm is operable to perform said swinging movement, and a latch with which the arm is engageable to hold the shutter in the closing position upon appropriate movement of said means.

6. A machine of the character described comprising a travelling carrier, a throat through which a mass is discharged upon said carrier, a shutter situated in the said throat, an arm by which the shutter is movable to opening and closing positions, a bar by which the arm is operable to perform said swinging movement, a latch with which the arm is engageable to hold the shutter in the closing position upon appropriate movement of the bar, and means for moving the latch to release the arm to permit opening the shutter upon reverse movement of the bar.

7. A machine of the character described comprising a travelling carrier, means to deliver the dry component of a plastic mass to the carrier, said means including a throat through which the component passes, a shutter situated in the throat having a shaft by which it is mounted to swing, an arm upon the shaft, a bar having a slot receiving the arm, said bar providing for shifting the arm and turning the shaft to open and close the shutter, and a latch mounted upon the rod for movement independently of the rod to permit passage of the arm upon shifting thereof in one direction thereby to hold the shaft in a given position.

8. A machine of the character described comprising a travelling carrier, means to deliver ceramic material to the carrier, said means including a pair of partitions defining a compartment for the material, angled deflectors carried by the opposing partitions and being in set relationship to define a tortuous passage through the compartments, a shutter for controlling the flow of material through the compartments being mounted below the edge of one of the deflectors and swingable across the compartments of another deflector, means for operating the shutter, and means for holding the shutter in either the open or closed position.

9. A machine of the character described comprising a travelling carrier, means to deliver ceramic material to the carrier, said means including a pair of partitions defining a compartment, a pair of feed gates, rails by which the gates are carried in spaced-apart relationship, and means for moving the rails in opposite directions thus introducing one of the gates into the compartment while retracting the other in alternation, thus interrupting the flow of material and causing the discharge of the material in batches upon the carrier.

10. A machine of the character described comprising a travelling carrier, means to deliver ceramic material to the carrier, said means including a pair of partitions defining a compartment, a pair of shutters situated one above the other in spaced relationship, the edge of one shutter being in advance of the edge of the other, pairs of rails supporting the respective shutters at the ends, and arms carried by each of the rails said arms having rollers, and a pair of revoluble cams having grooves receiving the rollers, said grooves being shaped to produce a reciprocating motion of the rails and shutters and designed to give a slow opening and quick closing movement of the shutters with an interval of rest.

11. A machine of the character described comprising a travelling carrier, means to deliver ceramic material to the carrier said means including partitions defining a compartment, a pair of gates spaced from each other the edge of one being in advance of the edge of the other and said gates being movable through one of the partitions in the compartment, a pair of rails for each gate, a revoluble cam shaft having a pair of cam disks with similarly shaped cam grooves on opposite sides said cam grooves being placed with respect to each other and arms carried by the pairs of rails having rollers occupying the various cam grooves, rotation of the cam shaft producing reciprocation of the gates alternately into and out of the compartments and causing a batch discharge of the material upon the carrier.

12. A machine of the character described comprising a travelling carrier, a material distributor for supplying the carrier with ceramic dust, a casing comprising part of the distributor said casing having a plurality of partitions defining compartments and throats through which the material passes in separate streams to the carrier, said partitions being successively shorter to provide increasing distances between the lower edges and the carrier thus permitting a building up of the material in layers, a bin containing the material, and a trough receiving the material from the bin having a revoluble auger for distributing the material throughout the length of the casing and to the conveyance compartment.

13. A machine of the character described comprising a travelling carrier, a material distributor casing above the carrier having partitions defining spray and material compartments, means operable across the material compartment to cause the discharge of successive batches of material, and means in the spray compartment for moistening the successive batches as they are built up upon the carrier.

14. A machine of the character described comprising a travelling carrier composed of jointed matrix units, means to discharge the elements of a plastic mass upon the carrier, and means to line the sides and bottom of the carrier to close the joints between the matrix units and prevent said elements from passing through the joints.

15. A machine of the character described comprising a travelling carrier composed of jointed matrix units, means for discharging the elements of a plastic mass upon the carrier, means carrying separate supplies of webbing for covering the bottom and sides of the carrier to close the joints between the units, and means to apply a temporary adhesive between the side webbing and sides of the matrix units to hold said webbing in place prior to the introduction of said elements.

16. A machine of the character described comprising a travelling carrier composed of jointed matrix units, means carrying a web to continuously cover the bottom of the carrier, means carrying a pair of webs to continuously cover the sides of the carrier, means to apply an adhesive to the latter webs, and means to press said webs into contact with the sides of the carrier to insure adhesion.

17. A machine of the character described comprising a travelling carrier composed of jointed matrix units, a roll supplying a width of webbing to completely cover the bottom of the carrier, a web roll having double paper strands to cover the sides of the carrier, means to separate said strands and direct them to the respective sides, means supported upon said separating means being arranged to apply an adhesive to said strands as they pass by said separating means toward the sides of the carrier, and means carried by said separating means exerting pressure against the strands thereby to press them into contact with said carrier sides.

18. A machine of the character described comprising a travelling carrier composed of jointed matrix units, an axle to support a roll of webbing providing a web to completely cover the bottom of the carrier, a webbing roll containing double web strands, a relatively stationary spreader frame of diverging shape to separate the strands and direct them to the respective sides of the carrier, means to apply an adhesive to the outside of the strands as they pass over the spreader frame, and resilient pressers attached to the spreader frame bearing against the opposite side of the strands to press the adhesive into contact with the sides of the carrier.

19. A machine of the character described comprising a travelling carrier composed of jointed matrix units, a paper roll supplying paper widths to completely cover the bottom of the carrier, a paper roll containing double strands to cover the sides of the carrier, a stationarily mounted spreader frame of diverging formation to separate the strands, a paste container stationarily mounted over the spreader frame, brushes carried by the spreader frame in contact with the paper strands, controllable means to feed the paste to the brushes and thereby apply the paste to said strands and resilient pressers carried by the spreader frame engaging the backs of the strands and pressing the pasted sides into contact with the sides of the carrier.

20. A machine of the character described comprising a travelling carrier composed of jointed matrix units, a paper roll supplying a paper width to completely cover the bottom of the carrier, a paper roll having double paper strands to cover the sides of the carrier, a spreader frame to separate the strands, means upon which the spreader frame is rigidly supported, brushes bearing against the upper margin of the paper strands, brush holders adjustably mounted upon the spreader frame, a paste container having valved pipes delivering paste to the brushes thus causing the application of paste along the upper margin of the paper strands, and resilient pressers carried by the spreader frame engaging the back of the strands and pressing the pasted sides against the sides of the carrier.

21. A machine of the character described comprising a travelling carrier composed of jointed matrix units, a paper roll to supply a paper width for completely covering the bottom of the carrier, a horizontally mounted axle extending transversely of the machine and carrying said paper roll, a paper roll containing double strands of paper, a vertical stub shaft upon which the latter roll is mounted, a spreader frame to separate the strands and direct them to the sides of the carrier, and means to move the latter paper roll toward the center of the machine upon diminution of the size thereof as the paper strands are drawn therefrom thus keeping the periphery of the latter paper roll in substantial alinement with the center of the spreader frame.

22. A machine of the character described comprising a travelling carrier composed of jointed matrix units, a paper roll supplying a paper width covering the bottom of the carrier, a paper roll containing double strands to cover the sides of the carrier, a frame by which both paper rolls are carried, a rail mounted upon the frame, a carriage mounted upon the rail having a pin carrying the latter in the roll, an alinement roller journaled upon a pin carried by the roll, a spreader frame in advance of which the alinement roller is situated, and means tending to slide the carriage upon the rail thereby keeping the latter roll in contact with the alinement roller and the paper strands in line with the spreader frame.

23. A machine of the character described comprising a travelling carrier composed of jointed matrix units, a roll supplying a paper web to cover the bottom of the carrier, a second roll containing double paper strands to cover the sides of the carrier, a spreader frame to separate the strands and direct them toward said sides, a frame by which both rolls are carried, a rail mounted upon the frame and having a pin near one end, an alinement roller journaled upon said pin in position in front of the spreader frame, a carriage mounted upon the rail having a pin carrying the second roll, a weight having a flexible element by which it is connected with the carriage, and a pulley mounted upon the frame over which said element passes permitting gravitation of the weight and pulling of the carriage upon the rail toward the center of the machine thereby keeping the periphery of the second roll in contact with the alinement roller and said paper strands in line with the spreader frame.

24. A machine of the character described comprising a travelling carrier composed of jointed matrix units, means to supply the carrier with a ceramic dust, and means to line the bottom and sides of the carrier with continuous widths to cover the joints between the matrix units preventing sifting of the dust through the joints.

25. A machine of the character described comprising a travelling carrier composed of jointed matrix units, means to discharge a ceramic dust upon the carrier, feed gates to control the discharge of the dust, means to line the bottom and sides of the carrier with a continuous web to cover the joints between the matrix units, an adhesive container, means receiving adhesive from the container and applying it to the webs for lining the sides of the carrier prior to the reception of the ceramic dust, means for agitating the adhesive, means for reciprocating the gates to cause a batch discharge of the dust, and means which is the common driver for both the agitator and reciprocating means.

26. A machine of the character described comprising a travelling carrier composed of jointed matrix units, a roll of double strands of relatively narrow paper to cover the sides of the carrier, the axis of the roll being perpendicular to the bottom of the carrier, a stationary spreader frame disposed over the carrier being of divergent formation to direct the strands toward the sides of the carrier and having the apex adjacent to the paper roll, a pair of idlers situated at the sides of the apex of the spreader frame to keep the paper strands substantially close together until fed by the frame, and alinement rollers with which one side of the paper roll engages, the point of engagement being substantially in line with the apex of the spreader frame, and means continuously keeping the paper roll in engagement with said alinement roller to preserve the relationship of the paper strands with the idlers as they leave the paper roll.

27. A machine of the character described comprising a travelling carrier composed of jointed matrix units having upstanding ends, a compression element having jointed compression units situated over the carrier, one of the components of said element travelling inside of the upstanding ends, means to deliver the elements of a plastic mass and forming said mass upon the carrier for compression by the compression element, and means to cover the bottom and ends of the carrier and to cover the top of the mass with a continuous web preventing extrusion of the mass and formation of prints thereon at the joints between the matrix units and compression units.

28. A machine of the character described comprising a travelling carrier, means to deliver a plastic mass to the carrier, means to compress the mass to unit thickness, saws to cut the mass both lengthwise and crosswise, said saws being arranged in gangs and in reverse position thus forming a drag cut thereby facilitating clearing the teeth of cuttings.

29. A machine of the character described comprising a travelling carrier, means to deliver a plastic mass to the carrier, means to compress the mass to unit thickness, a gang of relatively stationary rip saws to divide the mass lengthwise, said saws being assembled in reverse position permitting ready clearance of cuttings from the teeth, a trough to catch the cuttings as they are flung from the periphery of the saws, and a conveyor operable in the trough to carry the cuttings to a point of disposal.

30. A machine of the character described comprising a travelling carrier for transporting a mass of material, a gang of saws to cut through the mass, a saw carriage supporting the saw gang over the carrier, an actuating dog carried by the saw carriage, a lug affixed to the carrier engaging the dog to move the carriage along with the carrier while the saws cut the mass, and means to release the dog from the lug at the end of the cut.

31. A machine of the character described comprising a travelling carrier for transporting a mass of material, a gang of saws to cut through the mass, a carriage supporting the saws above the carrier, an actuating dog carried by the saw carriage, a plurality of lugs affixed to the carrier one of the lugs being engageable with the dog to move the carriage along with the carrier while the saws perform the cut, means to release the dog from the lug at the end of the cut, and means to return the saw carriage in time for engagement on a succeeding lug with the dog for a repetition of the cutting operation of the saws at a different place in the plastic mass.

32. A machine of the character described comprising a travelling carrier for transporting a mass of material, a saw carriage disposed over the carrier and having a gang of saws to cut the mass in a predetermined direction, means effecting connection between the carriage and carrier transporting the carriage with the carrier during the sawing operation, a clutch-operated driving device having operative connection with the saw carriage, and means actuated by the saw carriage at the end of a predetermined movement with the carrier and at the end of a sawing operation thereby to shift the clutch and set said device in operation to return the saw carriage.

33. A machine of the character described comprising a travelling carrier for transporting a mass of material, a gang of saws for dividing the mass crosswise, a saw carriage comprising a main frame movable with the carrier for a determined period, an auxiliary frame supporting the saw gang being simultaneously movable upon the main frame crosswise of the carrier, a saw frame carrying the gang saw, means causing the saw frame to move vertically in respect to the auxiliary frame prior to the cross cut, and mutually engaging means carried by the auxiliary and saw frames for guiding the saw frame in said movement.

34. A machine of the character described comprising a travelling carrier for transporting a mass of material, a gang of saws to cut the mass crosswise, a saw carriage comprising a main frame movable with the carrier, an auxiliary frame transversely movable upon the main frame and supporting the gang saw, an arrangement of flexible elements connected with opposite sides of the auxiliary frame said arrangement including pulleys to which the elements are applied, a stationary rack, and gearing carried by the main frame engaging the rack and being set in motion upon movement of the main frame thereby to actuate the pulleys and so wind the flexible elements as to simultaneously move the auxiliary frame crosswise upon the main frame and thus permit the gang saw to perform the cut.

35. A machine of the character described comprising a travelling carrier for transporting a mass of material, a saw gang for cutting the mass crosswise, a saw carriage comprising a main frame movable with the carrier, an auxiliary frame carrying the saw gang being transversely moveable upon the main frame, a stationary rack, a shaft journaled upon the main frame and carrying pulleys, flexible elements applied to the pulleys and connected with opposite sides of the auxiliary frame, and gearing arranged between the pulley shaft and rack causing a winding and unwinding action of the pulleys upon the flexible elements thereby to simultaneously move the auxiliary frame and permit the saw gang to make the cut.

36. A machine of the character described comprising a travelling carrier for transporting a mass of material, a saw for cutting the mass crosswise, a saw carriage comprising a main frame making alternate forward and return movements in respect to the carrier, an auxiliary frame supporting the saw and being transversely movable upon the main frame, an arrangement of pulleys carried by the main frame having reversely wound flexible elements attached to opposite sides of the auxiliary frame, means for driving the pulleys in first one then the other direction to agree with the forward and return movement of the main frame thereby to alternately move the auxiliary frame upon cutting and return movement, and means to lower and raise the saw gang in respect to the auxiliary frame in agreement with said movements.

37. A machine of the character described comprising a travelling carrier for transporting a mass of material, a saw carriage having a saw gang for cutting the mass in a determined direction and being forwardly and reversely movable in respect to the carrier, engaging means mutually carried by the carrier and saw carriage causing said forward movement, a mechanism by which the saw carriage is reversely moved, a shifting device by which said mechanism is actuated, and means on the saw carriage for shifting said means at the ends of the forward and reverse movements to respectively start and stop operation of said mechanism for the return movement of the saw carriage.

38. A machine of the character described comprising a travelling carrier for transporting a mass of material, a carriage forwardly and reversely movable in respect to the carrier having a saw gang for cutting the mass in a determined direction, means carried by the carrier and saw carriage being engageable to cause the forward movement of the saw carriage, an idle mechanism for returning the saw carriage, a continuously driven pinion having a clutch face, a co-acting clutch collar, and shifting means actuated by the saw carriage at the end of the forward motion thereof to shift the clutch collar into engagement with said face to start said mechanism and reversely shift said clutch collar at the end of the return movement of the saw carriage to stop said mechanism and stop said carriage.

39. A machine of the character described comprising a travelling carrier containing a compressed plastic mass, a saw carriage having a saw gang arranged to move across and cut the mass as the carriage moves with the carrier, means to move the carriage with the carrier comprising a lug on the carrier and a dog on the carriage, means to disengage the dog from the lug thus to stop the carriage when a cut has been performed, a continuously driven pinion having a clutch face, a shiftable co-acting clutch collar, idle gearing for returning the carriage, a bell crank for shifting the clutch collar, a slide bar connected with the bell crank having spaced lugs, and means on the carriage engaging one of the lugs at the end of a forward movement causing shifting of the clutch collar to start the gearing and return the carriage and engaging the other lug at the end of the return movement for the reverse effect.

40. A machine of the character described comprising a travelling carrier containing a compressed plastic mass, framework upon which the carrier rests, a saw carriage movable upon the framework and carrying a saw gang to cut the mass in a determined direction, means on the carriage and carrier being engageable to move the carrier during the cut, means effecting disengagement of said means to stop the carriage at the end of the cut, a continuously driven pinion having a clutch face, a clutch shaft having gear and rack connections with the saw carriage and supporting the pinion but revolving idly when the carriage runs forwardly, a clutch collar slidable but keyed upon the shaft, a bell crank to shift the collar, a shift bar supported and guided upon the framework being connected with the bell crank, lugs upon the shift bar in spaced relationship, and means on the carriage being engageable with one other lug upon stopping of the carriage to shift the bar and thus the clutch collar into engagement with the clutch pinion to drive the shaft and return the carriage, said means then engaging the other lug to produce the reverse effect.

41. A machine of the character described comprising a travelling carrier containing a compressed plastic mass, a saw carriage movable in forward and reverse directions over the carrier and having a saw gang to cut the mass in a determined direction during forward movement, a rack mounted on the carriage, a gear meshing with the rack and running idle during forward movement of the carriage, and means to apply driving power to the gear to perform the return movement of the carriage.

42. A machine of the character described comprising a travelling carrier containing a compressed plastic mass, a saw carriage movable in forward and reverse directions over the carrier and having a saw gang to cut the mass in a determined direction during forward movement, a rack mounted on the carriage, a gear meshing with the rack and running idle during forward movement of the carriage, means to apply driving power to the gear to perform the return movement of the carriage, and means operated by the carriage at the end of the return movement to terminate the driving power and thus again render the gear idle.

43. A machine of the character described comprising a travelling carrier for transporting a mass of material, a saw carriage comprising a main frame movable with the carrier, a saw gang to cut the mass crosswise during said movement of the main frame, a saw frame carrying the gang, an auxiliary frame upon which the saw frame is vertically slidable and being transversely movable upon the main frame, and an articulated suspension apparatus by which the saw frame is normally suspended upon the auxiliary frame to keep the saw gang elevated.

44. A machine of the character described comprising a travelling carrier for transporting a mass of material, a saw carriage comprising a main frame movable with the carrier, a saw gang to cut the mass crosswise during said movement of the main frame, a saw frame carrying the gang, an auxiliary frame upon which the saw frame is vertically slidable and being transversely movable upon the main frame, articulated suspension apparatus by which the saw frame is normally suspended upon the auxiliary frame to keep the saw gang elevated, and means arranged to release said suspending means at the beginning of a movement of the main frame with the carrier thereby to drop the saw frame and saw gang into cutting position.

45. A machine of the character described comprising a travelling carrier for transporting a mass of material, a saw carriage comprising a main frame movable with the carrier, a saw gang to cut the mass crosswise during said movement of the main frame, a saw frame carrying the gang, an auxiliary frame upon which the saw frame is vertically slidable and being transversely movable upon the main frame, articulated suspension apparatus by which the saw frame is movably suspended upon the auxiliary frame to keep the saw gang elevated, means arranged to release said suspending means at the beginning of a movement of the main frame with the carrier thereby to drop the saw frame and saw gang into cutting position, and means limiting the extent of dropping of the saw frame and gang.

46. A machine of the character described comprising a travelling carrier containing a compressed plastic mass, a saw carriage comprising main and auxiliary frames simultaneously movable with and across the carrier respectively, a saw frame having a saw gang being vertically guided upon the auxiliary frame, a latch arrangement by which the saw frame is suspended in an elevated position upon the auxiliary frame, relatively stationary means by which the latch arrangement is actuated upon forward movement of the carriage with the carrier to release and drop the saw frame into cutting position upon the carrier, connected toggle arms mounted between the saw and auxiliary frames to limit the drop of the saw frame, and resilient means associated with the toggle arms to absorb the shock of the drop.

47. A machine of the character described comprising a travelling carrier containing a plastic mass, a saw carriage comprising a main frame movable with the carrier and having an auxiliary frame transversely movable thereupon, a saw gang supported by a saw frame vertically guided upon the auxiliary frame, a latch rod journaled upon the auxiliary frame and carrying a latch, a latch carried by the saw frame, means tending to turn the latch rod permitting engagement of the latches and supporting the saw frame in an elevated position, and relatively fixed means engageable upon movement of the main frame with the carrier causing turning of the latch rod against the influence of said means thus releasing the latches and permitting dropping of the saw frame into cutting position.

48. A machine of the character described comprising a travelling carrier containing a plastic mass, a saw carriage comprising a main frame movable with the carrier and an auxiliary frame transversely movable upon the main frame, a saw frame vertically guided upon the auxiliary frame and carrying a saw gang, a latch rod supported upon the auxiliary frame and having a latch, a latch on the saw frame, a release plate carried by the latch rod, means turning the latch rod into a position of engagement of the latches and fixing the position of the release plate, and a pivoted dog permitting passage of the release plate to an initial position but being rigidly held to cause turning of the latch rod by contact of the release plate upon movement of the saw carriage with the carrier thus disengaging the latches and permitting the saw frames to drop.

49. A machine of the character described comprising a traveling carrier containing a compressed plastic mass, a saw frame carrying a saw gang for cutting the mass, a saw carriage comprising a main frame movable with the carrier and an auxiliary frame carrying the saw frame and being transversely movable upon the main frame, means to sustain the saw frame in elevated position prior to a cutting operation said means comprising a latch on the saw frame, a latch rod having a complementary latch to engage the foregoing latch, standards on the auxiliary frame supporting the latch rod, one of said standards having an arm with the ends bent to form stops, a plate depending from the latch rod, a spring disposed between said plate and one of the stops pressing said plate against the other stop thus limiting the movement of the latch rod at which said latches engage, and means to turn the latch rod against the tension of said spring causing the latches to disengage and permit the saw frame to drop.

50. A machine of the character described comprising a carrier of a compressed plastic mass, a saw frame carrying a saw gang to cut the mass, a saw carriage frame upon which the saw frame is supported, an arrangement of cleats by which the saw frame is guided during vertical movement upon the saw carriage frame, and an articulated arrangement of arms and links mounted upon the saw carriage frame and connected with the saw frame for conveying the latter through its movements.

51. A machine of the character described comprising a carrier of a compressed plastic mass, a saw frame carrying a saw gang to cut the mass, a saw carriage frame upon which the saw frame is supported, an arrangement of cleats by which the saw frame is guided during vertical movement upon the saw carriage frame, an articulated arrangement of arms and links mounted upon the saw carriage frame and connected with the saw frame for conveying the latter through its movements, and means for applying the necessary force to one of the arms for raising the saw frame from a previously assumed depressed and cutting position in respect to the saw carriage frame.

52. A machine of the character described comprising a carrier of a compressed plastic mass, a saw frame carrying a saw gang to cut the mass, a saw carriage frame upon which the saw frame is guided during vertical movement upon the saw carriage frame, an articulated arrangement of arms and links mounted upon the saw carriage frame and connected with the saw frame for conveying the latter through its movements, a motor mounted upon the saw carriage frame, and means arranged to continuously drive the saw gang from the motor during the up and down movements of the saw frame and during the position thereof at the extremities of said movements.

53. A machine of the character described comprising a carrier of a compressed plastic mass, a saw frame carrying a saw gang to cut the mass, a saw carriage frame supporting the saw frame, cleats upon both frames for guiding the saw frame through vertical movement, a pair of shafts supported upon the saw carriage frame, carrying arms mounted upon said shaft, links by which the saw frame is suspended being connected with the saw frame and with certain arms, and a reach rod connecting the remaining arms of the two shafts synchronizing the turning movement of one shaft with that of the other thus lowering and raising the saw frame in an even manner.

54. A machine of the character described comprising a carrier of a compressed plastic mass, a saw frame carrying a saw gang to cut the mass, a saw carriage frame supporting the saw frame, cleats upon both frames for guiding the saw frame through vertical movement, a pair of shafts supported upon the saw carriage frame, carrying arms mounted upon said shaft, links by which the saw frame is suspended being connected with the saw frame and with certain arms, a reach rod connecting the remaining arms of the two shafts synchronizing the turning movement of one shaft with that of the other thus lowering and raising the saw frame in an even manner, a lever carried by one of the shafts, and means to apply force to the lever thus turning both shafts and raising the saw frame from a previously dropped position.

55. A machine of the character described comprising a carrier of a compressed plastic mass, a saw frame carrying a saw gang to cut the mass, a saw carriage frame by which the saw frame is supported and upon which it is vertically movable, toggles connected together and respectively mounted upon the two frames said panels extending to limit the downward movement of the saw frame, and a resilient element affixed to one of the toggles and bearing against the other to absorb the shock of the downward movement of the saw frame and to break the joints of the toggles prior to a raising movement of the saw frame.

56. A machine of the character described comprising a carrier of compressed plastic mass, a saw frame carrying a saw gang for cutting the mass, a saw carriage frame by which the saw frame is supported and upon which it is vertically movable, an arrangement of arms journaled upon the saw carriage frame having links connected with the saw frame said arms including a lever, and a releasable weight having an associated depressor plate for engaging the lever and actuating the arms and move the saw frame to a raised position.

57. A machine of the character described comprising a carrier of compressed plastic mass, a saw frame carrying a saw gang for cutting the mass, a saw carriage frame by which the saw frame is supported and upon which it is vertically movable, an arrangement of arms journaled upon the saw carriage frame having links connected with the saw frame said arms including a lever, a dash pot having a weight operable therein, a depressor plate associated with the weight, and means to release the weight from an elevated position in the dash pot permitting depression of the lever by said plate upon gravitation of the weight thereby to raise the saw frame.

58. A machine of the character described comprising a carrier of a compressed plastic mass, a saw frame carrying a saw gang to cut the mass crosswise, a saw carriage comprising a main frame movable forward and backward in respect to the carrier and an auxiliary frame supporting the saw frame movable crosswise and back upon the main frame for the performance of cutting and return operations, means permitting the saw frame to drop to cutting position prior to either forward or crosswise movement of the main and auxiliary frames, means actuated by the main frame upon backward movement to be in readiness for causing the raising of the saw frame, and means actuated by the main frame upon the forward movement causing said means thus set in readiness to raise the saw frame prior to the backward movement of the main frame or return movement of the auxiliary frame.

59. A machine of the character described comprising a carrier of a compressed plastic mass, a saw carriage movable forwardly with and backwardly in respect to the carrier, a saw frame carrying a saw gang to cut the mass crosswise being movable across the saw carriage in agreement with the movement thereof and being lowered and raised for the performance of the cutting and returning strokes, means by which the saw frame is permitted to lower prior to the cutting stroke, and means by which the saw frame is raised at the end of the cutting stroke, said means comprising a movable weight, means actuated near the end of the backward stroke of the saw carriage to raise the weight, means to hold the weight raised, and means actuated at the end of the forward movement of the saw carriage to release the weight and cause raising of the saw frame.

60. A machine of the character described comprising a carrier of a compressed plastic mass, a saw carriage forwardly and backwardly movable in respect to the carrier, a saw frame carrying a saw gang to cut the mass crosswise being movable crosswise and back to agree with said forward and backward movements of the saw carriage, a relatively stationary latch, a weight having associated means for raising the saw frame upon gravitation of the weight, means actuated by the saw carriage near the end of a backward movement to hang up the weight by means of the latch thus to place the associated means in readiness for operation, and means on the saw carriage for lifting the latch at the end of a forward movement thereby to release the weight and permit the associated means to raise the saw frame.

61. A machine of the character described comprising a carrier of a compressed plastic mass, a saw frame carrying a saw gang for cutting the mass crosswise, a saw carriage upon which the saw frame is supported being movable with the carrier during transverse movement of the saw gang for the cutting operation, a weight having an associated depressor plate, means supporting the weight in an elevated position, means on the carriage for displacing said supporting means and releasing the weight at the end of the forward movement of the saw carriage, and means associated with the saw frame then assuming a position adjacent to the depressor plate causing a raising of the saw frame and gang from the cutting position by virtue of the downward movement of said plate.

62. A machine of the character described comprising a travelling carrier containing a compressed plastic mass, a saw carriage having a saw gang assuming a cutting position and being movable crosswise of the travelling carrier, means causing the carriage to move with the carrier during the cross cutting operation, a weight having an associated depressor plate, a latch arranged to support the weight in an elevated position, means on the carriage associated with the saw gang assuming a position beneath the depressor plate after a predetermined movement of the carrier, means then causing disengagement of the carrier from the carriage thus stopping the latter, and means for simultaneously releasing the latch permitting dropping of the weight and gravitation of the depressor plate upon said associated means thereby raising the saw gang from the operative position.

63. A machine of the character described comprising a travelling carrier containing a compressed plastic mass, a saw carriage having a saw gang assuming a cutting position and being movable crosswise of the travelling carrier, means causing the carriage to move with the carrier during the cross cutting operation, a weight having an associated depressor plate, a latch arranged to support the weight in an elevated position, means on the carriage associated with the saw gang assuming a position beneath the depressor plate after a predetermined movement of the carrier, means then causing disengagement of the carrier from the carriage thus stopping the latter, means for simultaneously releasing the latch permitting dropping of the weight and gravitation of the depressor plate upon said associated means thereby raising the saw gang from the operative position, and means then set in operation for moving the saw carriage reversely in respect to the carrier to the stopping position.

64. A machine of the character described comprising a travelling carrier containing a compressed plastic mass, a saw carriage movable with the carrier, a saw frame having a saw gang movable with the carrier and transversely thereof while in cutting position to cut the mass crosswise, means to stop the movement of the carriage when the cross cut is completed, and a dash pot and movable piston arrangement to then raise the saw frame and gang from the cutting position.

65. A machine of the character described comprising a travelling carrier containing a compressed plastic mass, a dash pot and stationary stem located beside the carrier, a sleeve slidable upon the stem having a depressor plate at the upper end and a weight at the lower end slidable in the dash pot, saw frames having a saw gang movable crosswise of the carrier to cut the mass, a saw carriage upon which the frame is transversely movable said carriage being movable with the carrier during the cross cutting operation, raising means associated with the saw frame assuming a position beneath the depressor plate when the cross cut is completed, means for effect stopping movement of the saw carriage, and means for causing the weight to slidably drop upon the stem within the dash pot causing operation of said raising means by said plate to raise the saw frame and saw gang from the cutting position.

66. A machine of the character described comprising a travelling carrier containing a compressed plastic mass, a saw carriage forwardly and reversely movable in respect to the carrier, a saw frame sustained by the carriage having a saw gang for cutting the mass transversely during forward movement of the carriage with the carrier, associated means for raising the saw frame, a weight having an associated depressor plate, a slidable element having abuttable portions and being connected with the weight by a circular element, means on the saw carriage engaging one of the portions near the end of the reverse movement of the carriage to slide said element and raise the weight and the depressor plate, a latch then engaging the other portion to thus sustain the weight and plate until the raising means takes the position beneath the said plate, and means associated with the saw carriage engaging the latch at the end of the forward movement releasing the weight and permitting raising of the saw frame from the cutting position.

67. A machine of the character described comprising a travelling carrier containing a compressed plastic mass, means for cutting the mass lengthwise into strips, means for cutting the strips crosswise into blocks, means for applying boards to transverse rows of the blocks, and means for inverting the rows of blocks and boards so that the blocks are carried by the boards in readiness for disposal.

68. A machine of the character described comprising a travelling carrier composed of jointed matrix units containing a compress-plastic mass, means for cutting the mass lengthwise into strips, means for cutting the strips crosswise into blocks, means for superimposing boards across the carrier in resting position upon the matrix unit, and means by which the blocks and boards are inverted in position causing the blocks to rest upon the boards in readiness for disposal.

69. A machine of the character described comprising a travelling carrier containing a compressed plastic mass, means for cutting the mass lengthwise into strips, means for cutting the strips crosswise into blocks, and means supplying boards to which transverse rows of blocks are applied in readiness for discharge from the machine and for firing.

70. A machine of the character described comprising a travelling carrier composed of jointed matrix units containing a compressed plastic mass, sprockets at the discharge end of the machine around which the carrier passes, means discharging weatherboards crosswise upon the successive matrix units, prior to passage around the sprockets, followers so stationed in respect to the sprockets as to keep the blocks and weatherboards in place while inversion of the blocks and weatherboards takes place, and means having limited yielding movement supporting the followers.

71. A machine of the character described comprising a travelling carrier composed of jointed matrix units containing a compressed plastic mass, sprockets at the discharge end of the machine around which the carrier passes, means discharging weatherboards crosswise upon the successive matrix units prior to passage around the sprockets, means having curved followers so stationed in respect to the sprockets as to keep the blocks and weatherboards in place while inversion of the blocks and weatherboards takes place, and resilient means tending to resist movement of the followers away from the sprockets.

72. A machine of the character described comprising a travelling carrier composed of jointed matrix units containing a compressed plastic mass, sprockets at the discharge end of the machine around which the carrier passes, means discharging weatherboards crosswise upon the successive matrix units prior to passage around the sprockets, means having a limited yielding movement being so stationed in respect to the sprockets as to keep the blocks and weatherboards in place while inversion of the blocks and weatherboards takes place, and an element forming a ledge along one edge of each weatherboard preventing displacement of the blocks upon the weatherboards while passing around said sprockets.

73. A machine of the character described comprising a travelling carrier disposed of jointed matrix units containing a compressed plastic mass, means for cutting the mass lengthwise in strips, means for cutting the strips crosswise into blocks, means for discharging boards crosswise upon the successive matrix units, prockets at the discharge end of the machine around which said matrix units and boards pass, means at one edge of the boards engaging portions of the units to hold the boards in place while passing around the sprockets, means along the opposite edges of the boards forming a stop to hold the blocks in place upon the boards while passing around the sprockets, and means to hold the boards on top of the matrix units while inversion of the boards and blocks in respect to the machine takes place.

74. A machine of the character described comprising a travelling carrier composed of jointed matrix units containing a compressed plastic mass, means for dividing the mass into blocks upon each of the matrix units, boards to which the blocks are applied, guide means for delivering the boards to the blocks, and an off-set at the extremity of the guide means adjacent to the carrier receiving successive boards in resting position from which they are taken by the matrix units as they pass therebeneath into superimposition upon the blocks on the respective matrix units.

75. A machine of the character described comprising a travelling carrier composed of jointed matrix units containing a compressed plastic mass, means for dividing the mass into blocks upon each of the matrix units, boards to which the blocks are applied, guide means for delivering the boards to the blocks, and an off-set at the extremity of the guide means adjacent to the carrier receiving successive boards in resting position from which they are taken by the matrix units as they pass therebeneath into superimposition upon the blocks on the respective matrix units, and means on the boards with which the matrix units engage to abstract the boards from said off-set said means assisting in holding the blocks in position upon the boards.

76. A machine of the character described comprising a travelling carrier composed of jointed matrix units, and means carrying separate supplies of webbing for covering the bottom and sides of the carrier to close the joints between the units.

77. A machine of the character described comprising a carrier, a gate, means to operate the gate for the discharge of material upon the carrier, an adhesive container, an agitator to stir an adhesive within the container, and a common operator for the agitator and the gate.

78. A machine of the character described comprising a compartment through which ceramic material is delivered, a plurality of feed gates, rails by which the gates are carried in spaced relationship, and means for alternately reciprocating the gates across the compartment to cause a batch discharge of the material.

79. A carrier, and means for depositing layers of material and moisture in alternation upon the carrier to build up a plastic mass.

80. A moving carrier, and plural means arranged in alternation for discharging dry material and moisture, and means against which the dry material is struck off by the movement of the carrier thus spreading the material out and giving the moisture access thereto.

81. A traveling matrix, a plurality of compartments above the matrix alternately discharging a dry material and containing liquid spray means, and progressively shorter extremities on the campartments next to the matrix exercising a dragging and rolling effect upon the material and thus producing a mixture.

82. A moving carrier, and a succession of compartments alternately discharging dry material and moisture upon the carrier, the compartments being spaced successively farther from the carrier to provide places at which the dry material is struck off by the movement of the carrier and give the moisture access to the various layers.

83. A traveling matrix, rails disposed thereover comprising a mid portion substantially parallel with the matrix, a compression element comprising plates fitting within the matrix, and rollers on the element riding on the rails and compressing a substance contained by the matrix when traversing the mid portion.

84. A traveling matrix, rails disposed outside of the matrix along the line of travel, a compression element comprising plates fitting within the matrix, and rollers riding on the rails, having connections with the compression element reaching over the sides of the matrix.

85. A traveling matrix, a compression element composed of hinged plates having rollers on the axes of the hing joints, and rails disposed above the matrix beneath which the rollers ride, having straight portions and upward inclinations at the extremities providing for the gradual application and release of pressure upon and from a mass in the matrix.

86. A traveling matrix, an endless flexible compression element, a drive sprocket and drum over which the element runs, and shafts by which the sprocket and drum are carried one being somewhat higher than the other thus producing a converging relationship of one side of the element with the matrix.

87. A traveling matrix having upstanding ends, links traveling above and extending beyond the upstanding ends, rollers, hinge pins connecting the links and carrying said rollers, and rails extending along the matrix upon which the rollers run.

88. A traveling carrier, a compression element having jointed compression units traveling with the carrier, and means to interpose a web between said units and a plastic mass on the carrier to prevent an imprint upon said mass.

89. A plastic mass carrier, and a saw arranged in reverse cutting position above the carrier to perform a drag cut upon the mass.

90. A plastic mass carrier, a saw arranged in reverse cutting position above the carrier to perform a drag cut upon the mass, and a trough in position to receive the cuttings of the saw.

91. A carrier having a lug, a frame-work over which the carrier travels having a fixed ramp, a saw frame, a saw which is movable across the saw frame and carrier for transversely cutting a mass conveyed by the carrier, and means carried by the saw frame engageable with the lug for transporting the saw frame with the carrier during the cross cut and engageable with the ramp for disconnecting said means from the lug for stopping the saw frame at the end of the cross cut.

92. A traveling carrier, a saw frame, a saw which is movable back and forth across the saw frame and carrier for transversely cutting a mass conveyed by the carrier, and means for automatically connecting and disconnecting the saw frame with the carrier at the beginning and the end of each back and forth movement of the saw.

93. A traveling carrier having a plurality of evenly spaced lugs, a saw frame having a saw which is movable across the saw frame for transversely cutting a mass conveyed by the carrier, a dog on the saw frame engageable with the successive lugs to periodically advance the saw frame with the carrier, and means fixed relatively to the carrier for repeatedly releasing the dog from the lugs.

94. A traveling carrier having a plurality of evenly spaced lugs, a saw frame having a saw which is movable across the saw frame for transversely cutting a mass conveyed by the carrier, a dog on the saw frame engageable with the successive lugs to periodically advance the saw frame with the carrier, means fixed relatively to the carrier for repeatedly releasing the dog from the lugs and means returning the saw frame to the original position after each release.

95. A saw frame having a saw, supporting means by which the saw frame is carried, an arrangement of pulleys having reversely wound flexible elements attached to opposite ends of the saw frame, and means for driving the pulleys in alternate directions to move the saw frame back and forth upon the supporting means.

EDWARD D. MARTINET.